(12) United States Patent
Kitazato et al.

(10) Patent No.: US 9,154,840 B2
(45) Date of Patent: Oct. 6, 2015

(54) RECEPTION APPARATUS, RECEPTION METHOD, TRANSMISSION APPARATUS, AND TRANSMISSION METHOD

(71) Applicant: Sony Corporation, Tokyo (JP)

(72) Inventors: Naohisa Kitazato, Tokyo (JP); Yasuaki Yamagishi, Kanagawa (JP); Yoshiharu Dewa, Tokyo (JP); Jun Kitahara, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/846,247

(22) Filed: Mar. 18, 2013

(65) Prior Publication Data

US 2014/0040968 A1 Feb. 6, 2014

Related U.S. Application Data

(60) Provisional application No. 61/677,759, filed on Jul. 31, 2012.

(51) Int. Cl.
| | |
|---|---|
| H04N 7/173 | (2011.01) |
| H04N 21/462 | (2011.01) |
| H04N 21/433 | (2011.01) |
| H04N 21/4335 | (2011.01) |
| H04N 21/81 | (2011.01) |
| H04N 21/858 | (2011.01) |

(52) U.S. Cl.
CPC ......... *H04N 21/462* (2013.01); *H04N 21/4331* (2013.01); *H04N 21/4335* (2013.01); *H04N 21/8173* (2013.01); *H04N 21/8586* (2013.01)

(58) Field of Classification Search
CPC ....................... H04N 21/426; H04N 21/25833
USPC .......................................... 725/115, 132, 140
See application file for complete search history.

(56) References Cited

U.S. PATENT DOCUMENTS

| | | | |
|---|---|---|---|
| 8,156,247 B2 * | 4/2012 | McMillen ..................... 709/240 |
| 2003/0177324 A1 * | 9/2003 | Timpanaro-Perrotta ...... 711/162 |
| 2004/0107319 A1 * | 6/2004 | D'Orto et al. ................. 711/133 |

(Continued)

FOREIGN PATENT DOCUMENTS

| | | |
|---|---|---|
| JP | 2001-78103 A | 3/2001 |
| JP | 2004-120408 A | 4/2004 |

(Continued)

OTHER PUBLICATIONS

U.S. Appl. No. 13/559,188, filed Jul. 26, 2012, Kitazato.

(Continued)

*Primary Examiner* — Hai V Tran
*Assistant Examiner* — Michael M Nguyen
(74) *Attorney, Agent, or Firm* — Oblon, McClelland, Maier & Neustadt, L.L.P.

(57) ABSTRACT

Enable appropriate caching of application programs executed in coordination with AV content. The cache memory temporarily stores a coordinated application that is executed in coordination with received AV content. When a plurality of coordinated applications are stored in the cache memory, a control block controls the cache memory according to the priority of the coordinated applications which corresponds to a predetermined frequency specified for each of them in advance. The present technology is applicable to, for example, television receivers that receive digital television broadcast signals.

12 Claims, 18 Drawing Sheets

(56) References Cited

U.S. PATENT DOCUMENTS

| | | | |
|---|---|---|---|
| 2004/0239810 A1* | 12/2004 | Takahashi | 348/565 |
| 2005/0034129 A1* | 2/2005 | Chew | 718/100 |
| 2005/0102385 A1* | 5/2005 | Muhonen et al. | 709/223 |
| 2007/0121612 A1* | 5/2007 | Nadeau et al. | 370/386 |
| 2007/0245396 A1* | 10/2007 | Kwon et al. | 725/132 |
| 2011/0075990 A1 | 3/2011 | Eyer | |
| 2011/0087777 A1* | 4/2011 | Sakai et al. | 709/224 |
| 2011/0088075 A1 | 4/2011 | Eyer | |
| 2011/0177775 A1* | 7/2011 | Gupta et al. | 455/3.06 |
| 2011/0222835 A1* | 9/2011 | Dougherty et al. | 386/248 |
| 2011/0243536 A1 | 10/2011 | Eyer | |
| 2011/0246488 A1 | 10/2011 | Eyer | |
| 2011/0247028 A1 | 10/2011 | Eyer | |
| 2011/0298981 A1 | 12/2011 | Eyer | |
| 2011/0299827 A1 | 12/2011 | Eyer | |
| 2011/0302599 A1 | 12/2011 | Eyer | |
| 2011/0302611 A1 | 12/2011 | Eyer | |
| 2011/0307920 A1 | 12/2011 | Blanchard et al. | |
| 2012/0044418 A1 | 2/2012 | Eyer | |
| 2012/0047531 A1 | 2/2012 | Eyer | |
| 2012/0050619 A1 | 3/2012 | Kitazato et al. | |
| 2012/0050620 A1* | 3/2012 | Kitazato | 348/723 |
| 2012/0054214 A1 | 3/2012 | Yamagishi et al. | |
| 2012/0054235 A1 | 3/2012 | Kitazato et al. | |
| 2012/0054267 A1 | 3/2012 | Yamagishi et al. | |
| 2012/0054268 A1 | 3/2012 | Yamagishi | |
| 2012/0054783 A1 | 3/2012 | Yamagishi | |
| 2012/0054784 A1 | 3/2012 | Kitazato et al. | |
| 2012/0054816 A1 | 3/2012 | Dewa | |
| 2012/0060197 A1 | 3/2012 | Kitahara et al. | |
| 2012/0063508 A1 | 3/2012 | Hattori et al. | |
| 2012/0072965 A1 | 3/2012 | Dewa | |
| 2012/0081508 A1 | 4/2012 | Kitazato | |
| 2012/0081607 A1 | 4/2012 | Kitazato | |
| 2012/0082266 A1 | 4/2012 | Kitazato et al. | |
| 2012/0082440 A1 | 4/2012 | Kitazato | |
| 2012/0084802 A1 | 4/2012 | Kitazato | |
| 2012/0084824 A1 | 4/2012 | Kitazato | |
| 2012/0084829 A1 | 4/2012 | Kitazato | |
| 2012/0185888 A1 | 7/2012 | Eyer et al. | |
| 2012/0253826 A1 | 10/2012 | Kitazato et al. | |
| 2012/0274848 A1 | 11/2012 | Kitahara et al. | |
| 2012/0275764 A1 | 11/2012 | Eyer | |
| 2013/0024894 A1 | 1/2013 | Eyer | |
| 2013/0024897 A1 | 1/2013 | Eyer | |
| 2013/0031569 A1 | 1/2013 | Kitazato et al. | |
| 2013/0036440 A1 | 2/2013 | Eyer | |
| 2013/0055313 A1 | 2/2013 | Eyer | |

FOREIGN PATENT DOCUMENTS

| | | |
|---|---|---|
| JP | 2007-515700 A | 6/2007 |
| JP | 2011-066556 | 3/2011 |
| JP | 2012-70351 A | 4/2012 |

OTHER PUBLICATIONS

U.S. Appl. No. 13/587,975, filed Aug. 17, 2012, Kitazato.
U.S. Appl. No. 13/593,554, filed Aug. 24, 2012, Kitazato et al.
U.S. Appl. No. 13/648,753, filed Oct. 10, 2012, Yamagishi.
U.S. Appl. No. 13/679,624, filed Nov. 16, 2012, Yamagishi.
U.S. Appl. No. 13/708,313, filed Dec. 7, 2012, Kitazato et al.
U.S. Appl. No. 13/741,863, filed Jan. 15, 2013, Kitazato et al.
U.S. Appl. No. 13/753,591, filed Jan. 30, 2013, Kitazato et al.
U.S. Appl. No. 13/777,429, filed Feb. 26, 2013, Kitazato et al.
U.S. Appl. No. 13/777,693, filed Feb. 26, 2013, Kitazato et al.
U.S. Appl. No. 13/777,734, filed Feb. 26, 2013, Kitazato et al.
U.S. Appl. No. 13/782,694, filed Mar. 1, 2013, Eyer.
U.S. Appl. No. 13/782,730, filed Mar. 1, 2013, Eyer.
U.S. Appl. No. 13/800,818, filed Mar. 13, 2013, Eyer.
U.S. Appl. No. 13/800,734, filed Mar. 13, 2013, Eyer.
U.S. Appl. No. 13/841,343, filed Mar. 15, 2013, Eyer.
International Search Report issued Oct. 1, 2013 in PCT/JP2013/069778 filed Jul. 22, 2013 with English language translation.

* cited by examiner

F I G . 4

| item | description |
|---|---|
| domain_name | The domain name of the provider's server (which TPT files are located) |
| segment_id | The unique name for the target segment. Provider can define it freely. |
| media_time | The time stamp of the target time position of the segment. |
| event_id | The ID for broadcast event related with any action for App control. |
| event_time | The target time for the broadcast event measured by media_time |
| spread | Randomized diffusion range of trigger action timing |
| additional_information | Any metadata which is fed to the application |

FIG. 5

| Element/Attribute (with @) | | | | No. permitted | Description & Value |
|---|---|---|---|---|---|
| TPT | | | | | |
| | @protocolVersion | | | 1 | Protocol version, major/minor |
| | @id | | | 1 | domain_name/program_id = segment id |
| | @tptVersion | | | 1 | Data version of this TPT |
| | @updatingTime | | | 0..1 | Recommended TPT polling interval |
| | @expireDate | | | 0..1 | Date after which this TPT will not be used |
| | @serviceId | | | 0..1 | NRT service_id |
| | @baseURL | | | 0..1 | Base URL for all relative URLs in TPT |
| | Capabilities | | | 0..1 | Essential capabilities for this segment |
| | LiveTrigger | | | 0..1 | Information about live trigger delivery |
| | | @URL | | 1 | URL of server for live Triggers |
| | | @deliveryType | | 1 | Streaming\|long polling\|short polling |
| | | @pollPeriod | | 0..1 | Short polling period in seconds |
| | Application | | | 1..N | Application for this segment |
| | | @appID | | 1 | Application ID, for reference by trigger |
| | | @appType | | 0..1 | Application type (default="App") |
| | | @appName | | 0..1 | Displayable name (for viewer consent) |
| | | @globalId | | 0..1 | Globally unique app ID |
| | | @appVersion | | 0..1 | Version of this app |
| | | @testApp | | 0..1 | Flag for test App; default="false" |
| | | @cookieSpace | | 1 | Bytes of persistent storage needed |
| | | @frequencyOfUse | | 0..1 | 1 hr, 1 day, etc. (for caching guidance) |
| | | @frequencyOfUpdate | | 0..1 | 1 hr, 1 day, etc. (for caching guidance) |
| | | @expireDate | | 0..1 | Expire date for caching |
| | | @availInternet | | 0..1 | Default="true" |
| | | @availBroadcast | | 0..1 | Default="true" |
| | | URL | | 1..N | App URL(s) — first URL is entry point |
| | | Capabilities | | 0..1 | Essential capabilities to present this App |
| | | ContentItem | | 0..N | Content item used by this App |
| | | | URL | 1..N | URL(s) of content items |
| | | | updatesAvail | 0..1 | Default="false" |
| | | | Size | 0..1 | Size of content item, in kilobytes |
| | | Event | | 1..N | Event targeted to this App |
| | | | @eventId | 1 | Event ID, for reference by trigger |
| | | | @destination | 0..1 | Targeted device type, e.g., HDTV, SDTV, external_1, external_2, etc. |
| | | | @action | 1 | "register", etc. |
| | | | @diffusion | 0..1 | Period for applying diffusion, in seconds |
| | | | data | 0..1 | Data to be used by this App for stream-event |

FIG. 6

| Element/Attribute (with @) | No. permitted | Description & Value |
|---|---|---|
| AMT | | |
| @protocolVersion | 1 | Protocol version, major/minor |
| @segmentId | 1 | domain_name/program_id = segment id |
| @beginMT | 1 | Start time of this segment time scope |
| Activation | 1..N | Activation message |
| @targetId | 1 | Identifies target event in form appId+eventId |
| @startTime | 1 | Start time of action period |
| @endTime | 0..1 | End time of action period |

RECEPTION APPARATUS, RECEPTION METHOD, TRANSMISSION APPARATUS, AND TRANSMISSION METHOD

CROSS-REFERENCE TO RELATED APPLICATION

This application claims the benefit of priority of Provisional Application Ser. No. 61/677,759, filed on Jul. 31, 2012, the entire content of which is incorporated herein by reference.

BACKGROUND

The technology disclosed herein relates to a reception apparatus, a reception method, a transmission apparatus, and a transmission method, and more particularly, to a reception apparatus, a reception method, a transmission apparatus, and a transmission method that are adapted to properly cache applications executed in coordination with AV content.

In the field of digital broadcasting, not only services based on broadcasting but also coordinated services linked with the Internet are expected to be introduced (refer to Japanese Patent Laid-open No. 2011-66556, for example). Such integrated services of broadcasting and communication allow application programs delivered via the Internet to be executed in conjunction with broadcast content such as a television program.

SUMMARY

Incidentally, when a plurality of application programs are obtained in a reception apparatus that receives broadcast content, the obtained application programs are cached in a cache memory thereof. Because there is a limit to the capacity of the cache memory, application programs that are more likely to be reused are cached preferentially.

For this reason, it is required for reception apparatuses to properly execute cache control so as to preferentially cache application programs that are more likely to be reused.

The present technology has been devised taking such circumstances into consideration. The present technology enables proper caching of application programs that are executed in conjunction with AV content such as broadcast content.

A reception apparatus according to a first embodiment of the present technology includes: a reception block configured to receive AV (Audio Visual) content; a cache memory configured to temporarily store an application program that is executed in conjunction with the AV content; and a control block configured to, when a plurality of the application programs exist, control the cache memory in accordance with priority of the application programs corresponding to a predetermined frequency specified for each of them in advance.

The priority may be determined based on at least one of a frequency of use and frequency of update of the application programs.

The application programs may be categorized into two groups, namely, those prioritized by a provider thereof and those that are not. The priority levels of the application programs categorized as to be preferred are set such that they are always higher than the priority levels of the other application programs not categorized as to be preferred.

The reception apparatus may further include a terminal information acquisition block configured to acquire terminal information that is used to determine the priority and can be obtained in the reception apparatus. The priority may be determined based on the terminal information.

The terminal information may be information that indicates a use history of the application program or a cache capacity or free capacity of the cache memory.

The priority may be determined based on an expiration date specified for each of the application programs in advance.

The reception apparatus may further include a trigger information acquisition block configured to acquire trigger information used to identify a command for controlling the operation of the application program, and a correlation table acquisition block configured to acquire a correlation table in which information obtained from the trigger information is correlated with the command. The control block controls the operation of the application program according to the command identified by the trigger information and correlation table.

The priority is determined according to at least one of frequency of use, frequency of update, and expiration date of the application program which are specified by the correlation table, and the category of priority of the application program set by the provider.

The reception apparatus may be an individual apparatus or an internal block constituting part of one apparatus.

A reception method and program according to the first embodiment of the present technology are a reception method and program corresponding to the reception apparatus according to the first embodiment of the present technology.

In the reception apparatus, method and program according to the first embodiment of the present technology, when AV content is received, if there are a plurality of application programs to be executed in coordination with the AV content in a cache memory that temporarily stores them, the cache memory is controlled in accordance with priority of the application programs corresponding to a predetermined frequency specified for each application program in advance.

A transmission apparatus according to a second embodiment of the present technology includes: a generation block configured to, when there exist a plurality of application programs that are to be executed in coordination with AV content, generate trigger information used to control the operations of the application programs recorded in a cache memory in accordance with priority corresponding to a predetermined frequency specified for each application program in advance; and a transmission block configured to transmit the trigger information along with the AV content.

The transmission apparatus may be an individual apparatus or an internal block constituting a part of one apparatus.

A transmission method according to the second embodiment of the present technology is a transmission method corresponding to the transmission apparatus according to the second embodiment of the present technology.

In the transmission apparatus and method according to the second embodiment of the present technology, when there exist a plurality of application programs that are to be executed in coordination with AV content, trigger information is generated to control the operations of the application programs recorded in a cache memory in accordance with priority corresponding to a predetermined frequency specified for each application program, and the trigger information is transmitted along with the AV content.

According to the first and second embodiments of the present technology, application programs to be executed in coordination with AV content can be properly cached.

BRIEF DESCRIPTION OF THE DRAWINGS

FIG. 4 shows a table of a detailed configuration of trigger information;

FIG. 5 shows a table of a detailed configuration of a TPT;

FIG. 6 shows a table of a detailed configuration of an AMT;

DETAILED DESCRIPTION OF THE PREFERRED EMBODIMENT

An embodiment of the present technology will be described hereafter with reference to the accompanying drawings.

[Exemplary Configuration of Broadcasting-Communication Coordinated System]

Figure 1:
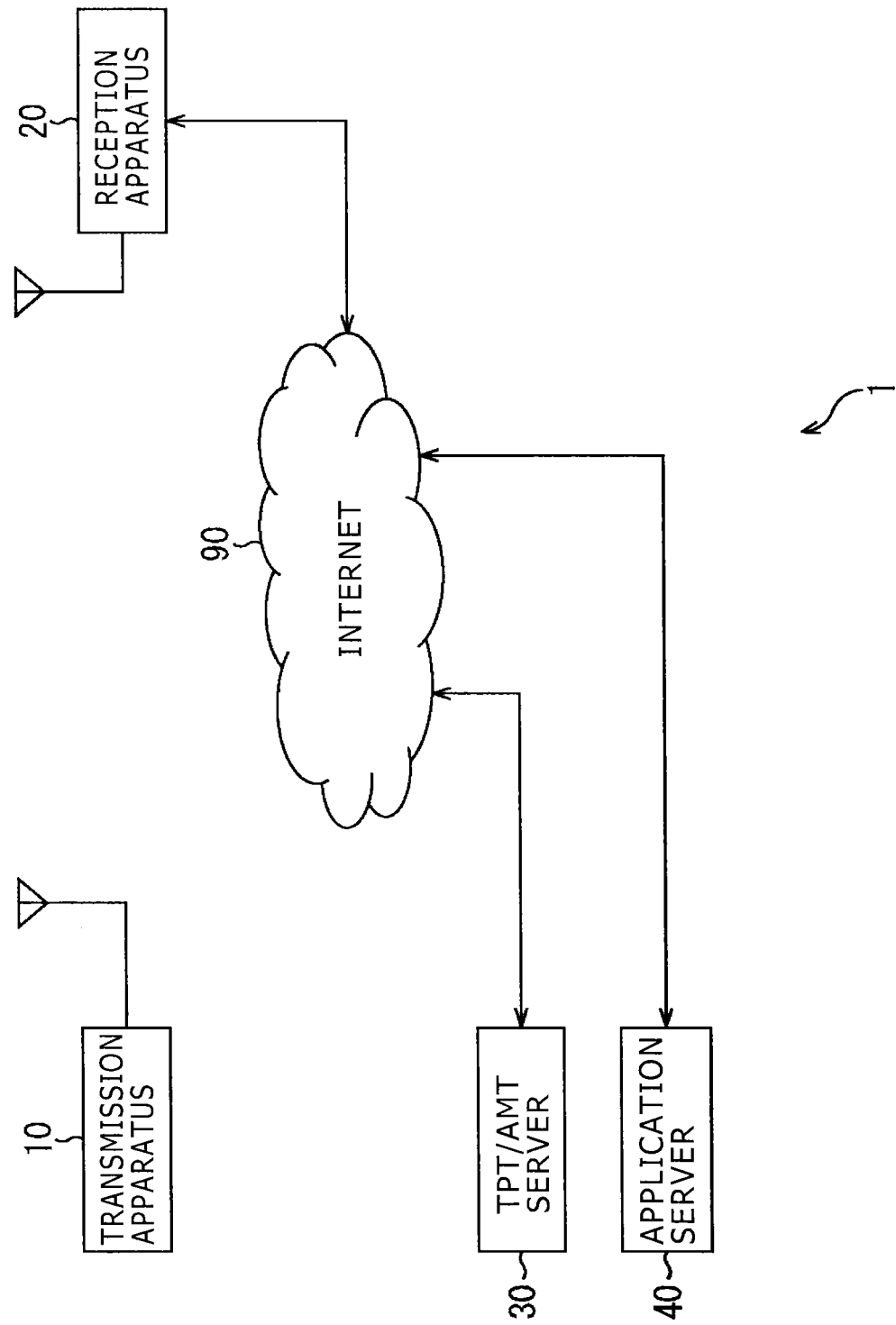
FIG. 1 is a schematic diagram illustrating an exemplary configuration of a broadcasting-communication coordinated system.

FIG. 1 shows a broadcasting-communication coordinated system 1. The broadcasting-communication coordinated system 1 is constituted by a transmission apparatus 10, a reception apparatus 20, a TPT/AMT server 30, and an application server 40.

The reception apparatus 20, the TPT/AMT server 30, and the application server 40 are interconnected via the Internet 90.

The transmission apparatus 10 transmits (or broadcasts) broadcast content, such as a television program or CM by digital television broadcast signals (hereafter simply referred to as broadcast signals). The transmission apparatus 10 is provided by, for example, a broadcaster and is arranged in a broadcasting station thereof.

The transmission apparatus 10 transmits trigger information used to control the operation of a coordinated application by including the trigger information in a broadcast signal. Here, the coordinated application is an application program that is run in conjunction with broadcast content.

The reception apparatus 20 receives broadcast signals transmitted from the transmission apparatus 10 and acquires video and audio data of the received broadcast content. The reception apparatus 20 displays the video data of the broadcast content on its display and outputs the audio data from a loudspeaker.

It should be noted that, hereafter, the reception apparatus 20 will be described as a television receiver as one example: however, the reception apparatus 20 may be incorporated in an electronic device, such as a video recorder, having no display or loudspeaker.

When trigger information from the transmission apparatus 10 is extracted, the reception apparatus 20 sets or calibrates the time of its internal clock (hereafter referred to as a media clock) based on the time information included in the extracted trigger information. In addition, in accordance with the trigger information from the transmission apparatus 10, the reception apparatus 20 accesses the TPT/AMT server 30 via the Internet 90 to acquire TPT and AMT.

The TPT/AMT server 30 manages TPT and AMT. The TPT/AMT server 30 is provided by a broadcast content producer, a broadcaster, or another like organization.

TPT (Trigger Parameters Table) is a table for identifying a command (or an event) for a coordinated application. For example, in a TPT, commands are associated with identifiers for identifying a command for a particular coordinated application.

AMT (Activation Messages Table) is a table for specifying a time at which a command (or an event) for a coordinated application is to be executed. For example, in an AMT, an identifier for identifying a command for a particular coordinated application is associated with a validity period or expiration time. Incidentally, the validity period or expiration time of a command is determined in accordance with the progression of broadcast content.

To be more specific, a TPT and AMT specify a command (or an event) for a particular coordinated application to be executed at a specific time.

The TPT/AMT server 30 provides a TPT and AMT via the Internet 90 in response to a query from the reception apparatus 20.

Based on the media clock, the reception apparatus 20 refers to the TPT and AMT to identify a command for a particular coordinated application. Then, the reception apparatus 20 controls the operation of the coordinated application according to the identified command.

In addition, according to the identified command, the reception apparatus 20 accesses the application server 40 via the Internet 90 to acquire the coordinated application.

The application server 40 manages coordinated applications. The application server 40 is provided by a broadcast content producer, a broadcaster, or another like organization.

In response to an inquiry from the reception apparatus 20, the application server 40 provides a coordinated application via the Internet 90.

It should be noted that although FIG. 1 shows only one reception apparatus 20 for the brevity of description, in actuality, the broadcasting-communication coordinated system 1 includes a plurality of reception apparatuses 20.

The broadcasting-communication coordinated system 1 is configured as described above.

[Exemplary Configuration of the Transmission Apparatus]

Figure 2:
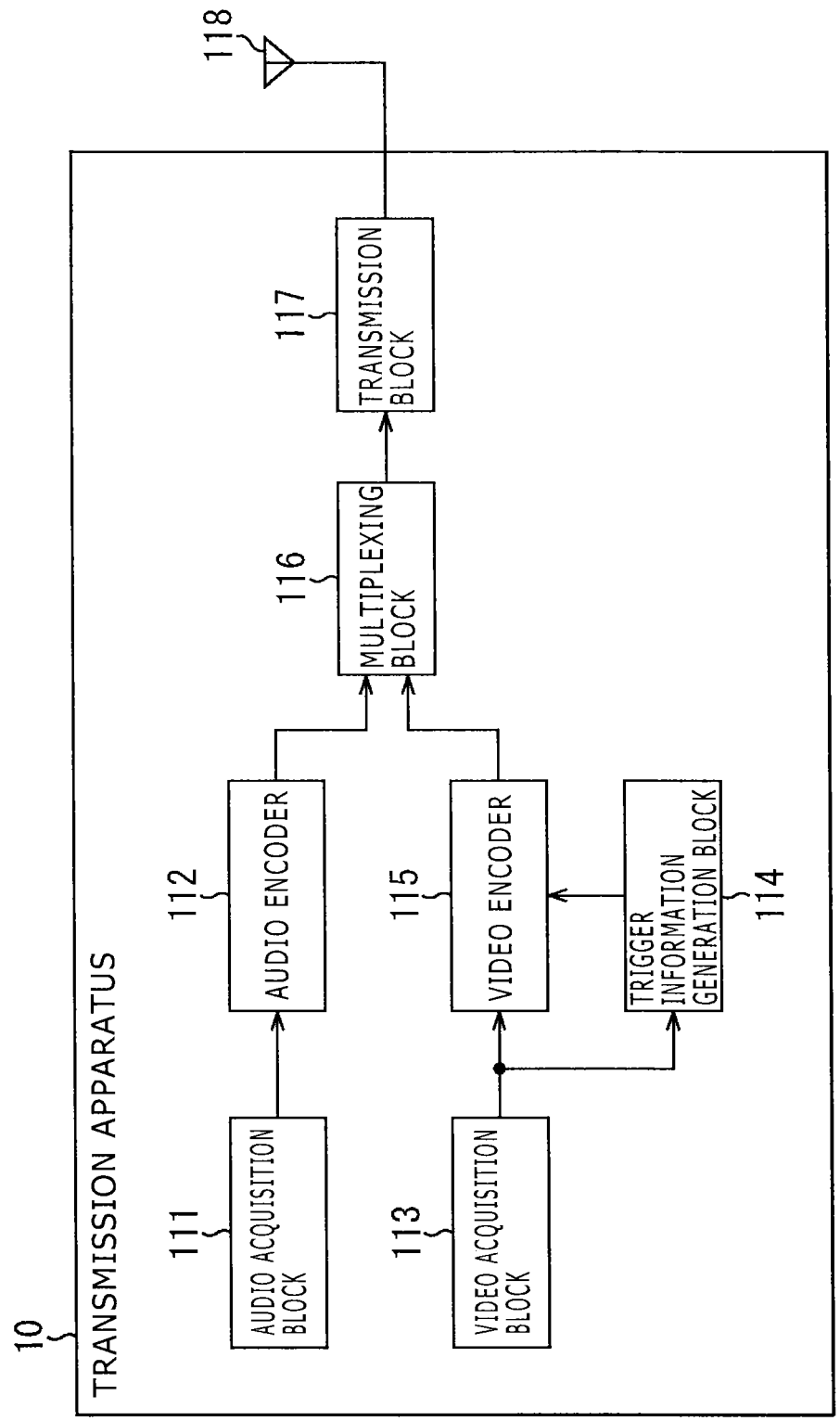
FIG. 2 is a block diagram illustrating an exemplary configuration of a transmission apparatus.

FIG. 2 shows an exemplary configuration of the transmission apparatus 10 shown in FIG. 1.

As shown in FIG. 2, the transmission apparatus 10 has an audio acquisition block 111, audio encoder 112, video acquisition block 113, trigger information generation block 114, video encoder 115, multiplexing block 116, a transmission block 117, and an antenna 118.

The audio acquisition block 111 acquires an audio signal of broadcast content from, for example, an external server, a microphone, or a recording medium, and supplies the obtained audio signal to the audio encoder 112.

The audio encoder 112 encodes the audio signal supplied from the audio acquisition block 111 based on MPEG (Moving Picture Experts Group) 2 or another encoding scheme and supplies the resulting audio stream to the multiplexing block 116.

The video acquisition block 113 acquires a video signal of broadcast content from, for example, an external server, a camera, or a recording medium, and supplies the obtained video signal to the trigger information generation block 114 and the video encoder 115.

The trigger information generation block 114 generates trigger information and supplies the generated trigger information to the video encoder 115. For example, trigger information is generated according to the progression of broadcast content corresponding to a video signal supplied from the video acquisition block 113.

The video encoder 115 encodes a video signal supplied from the video acquisition block 113 based on MPEG2, for example.

In addition, the video encoder 115 sets trigger information in the video stream obtained by the encoding. For example, trigger information is arranged in subtitle data in a user data area of a video stream.

The video stream including trigger information is supplied to the multiplexing block 116.

The multiplexing block 116 multiplexes the audio stream from the audio encoder 112 and the video stream from the video encoder 115 and supplies the resulting transport stream to the transmission block 117.

The transmission block 117 transmits the transport stream supplied from the multiplexing block 116 as a broadcast signal via the antenna 118.

The transmission apparatus 10 is configured as described above.

[Exemplary Configuration of the Reception Apparatus]

Figure 3:
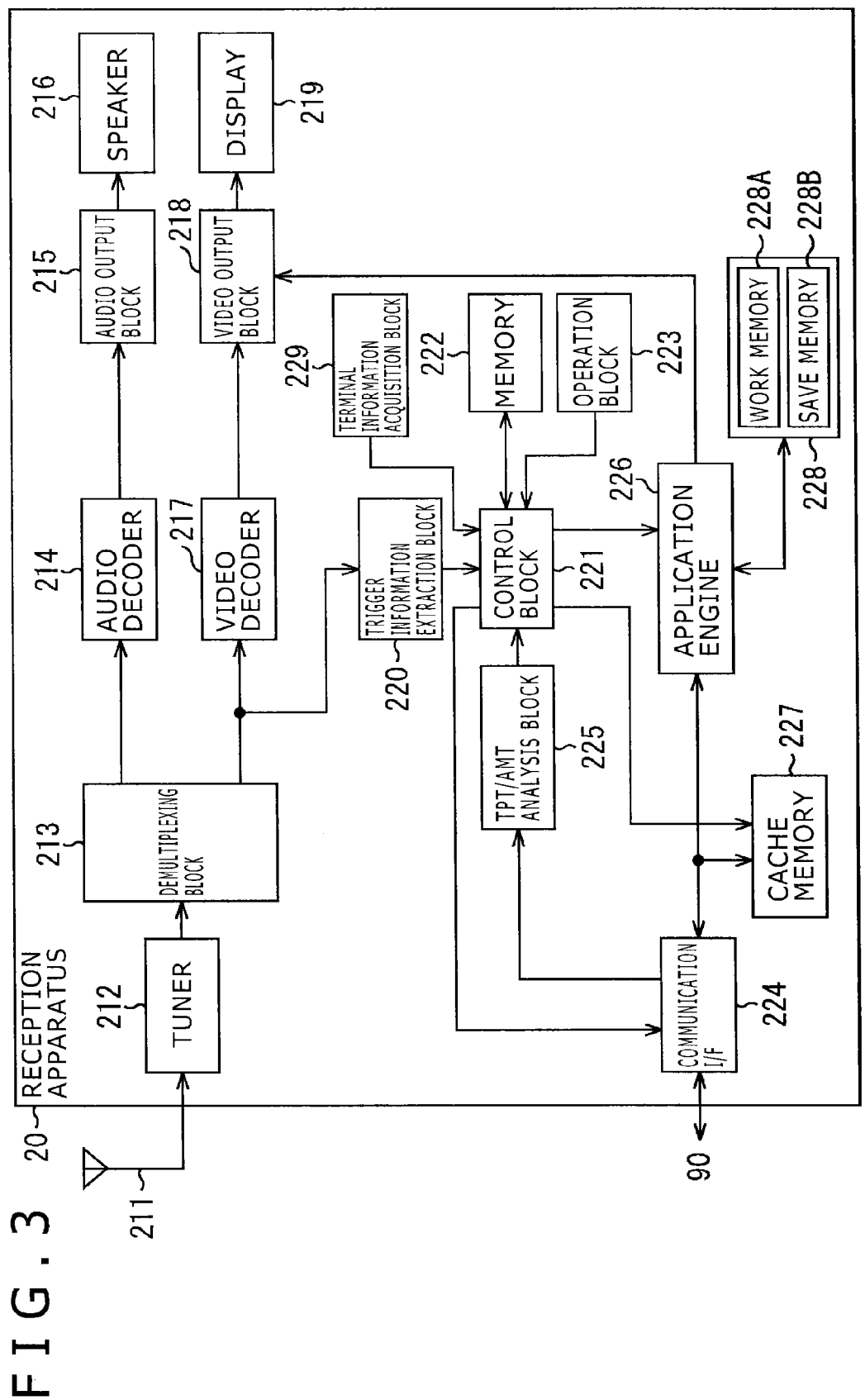
FIG. 3 is a block diagram illustrating an exemplary configuration of a reception apparatus.

FIG. 3 shows an exemplary configuration of the reception apparatus 20 shown in FIG. 1.

As shown in FIG. 3, the reception apparatus 20 is composed of a tuner 212, demultiplexing block 213, audio decoder 214, audio output block 215, loudspeaker 216, video decoder 217, video output block 218, and display 219.

In addition, in order to operate coordinated applications, the reception apparatus 20 includes a trigger information extraction block 220, control block 221, memory 222, operation block 223, communication I/F 224, TPT/AMT analysis block 225, application engine 226, cache memory 227, application memory 228, and terminal information acquisition block 229.

The tuner 212 demodulates a broadcast signal received via the antenna 211 and supplies the resulting transport stream to the demultiplexing block 213.

The demultiplexing block 213 demultiplexes the transport stream supplied from the tuner 212 into an audio stream and a video stream and supplies them to the audio decoder 214 and the video decoder 217, respectively.

The audio decoder 214 decodes the audio stream supplied from the demultiplexing block 213 using a decoding scheme corresponding to the encoding scheme of the audio encoder 112 (FIG. 2) such as MPEG2, and supplies the resulting audio signal to the audio output block 215.

The audio output block 215 supplies the audio signal supplied from the audio decoder 214 to the loudspeaker 216. The loudspeaker 216 outputs a sound corresponding to the audio signal supplied from the audio output block 215.

The video decoder 217 decodes the video stream supplied from the demultiplexing block 213 using a decoding scheme corresponding to the encoding scheme of the video encoder 115 (FIG. 2) such as MPEG2, and supplies the resulting video signal to the video output block 218.

The video output block 218 supplies the video signal supplied from the video decoder 217 to the display 219. The display 219 displays a video corresponding to the video signal supplied from the video output block 218.

The trigger information extraction block 220 constantly monitors video streams separated by the demultiplexing block 213, extracts (or acquires) trigger information arranged in the video stream, and supplies the extracted trigger information to the control block 221.

The control block 221 executes a control program stored in the memory 222 in advance to control the operations of the component blocks of the reception apparatus 20.

In the memory 222, the control program to be executed by the control block 221 is stored in advance. The operation block 223 receives various operations from the user and sends corresponding operation signals to the control block 221.

In addition, in accordance with the trigger information supplied from the trigger information extraction block 220, the control block 221 controls the communication I/F 224 to access the TPT/AMT server 30 via the Internet 90 to request a TPT and AMT. Under the control of the control block 221, the communication I/F 224 receives the TPT and AMT transmitted from the TPT/AMT server 30 and supplies them to the TPT/AMT analysis block 225.

The TPT/AMT analysis block 225 acquires the TPT and AMT supplied from the communication I/F 224. The TPT/AMT analysis block 225 analyzes the obtained TPT and AMT and holds the analysis results in a built-in memory (not shown). In response to a request from the control block 221, the TPT/AMT analysis block 225 sends the analysis results of the TPT and the AMT held in the memory.

Based on the time information included in the trigger information supplied from the trigger information extraction block 220, the control block 221 sets or calibrates the media clock.

Further, based on the TPT and AMT analysis results from the TPT/AMT analysis block 225 and the time indicated by the media clock, the control block 221 identifies a command for a particular coordinated application. For example, if a predetermined valid condition such as the first entering of the time indicated by the media clock into the valid period of the command is satisfied, the control block 221 identifies this valid command.

Incidentally, when an identifier for identifying a command for a particular coordinated application is included in the trigger information supplied from the transmission apparatus 10, then the control block 221 refers to the TPT and AMT analysis results to identify the command for the particular coordinated application corresponding to the identifier.

According to the identified command, the control block 221 controls the application engine 226 to control the operation of the coordinated application.

Under the control of the control block 221, the application engine 226 controls the communication I/F 224 to access the application server 40 via the Internet 90, thereby requesting a coordinated application. The communication I/F 224 receives the coordinated application transmitted from the application server 40 and holds the received coordinated application in the cache memory 227.

Under the control of the control block 221, the application engine 226 reads out the coordinated application from the cache memory 227 and executes it. A video signal of the active coordinatedd application is supplied to the video output block 218.

The video output block 218 combines the video signal supplied from the application engine 226 with the video signal supplied from the video decoder 217 and displays the resulting video on the display 219.

The application memory 228 is made up of a work memory 228A and a save memory 228B. The application engine 226 records data associated with the active coordinated application to the work memory 228A.

Further, when the active coordinated application is to be suspended, the application engine 226 moves data from the work memory 228A of the application memory 228 to the save memory 228B. Then, when the stopped coordinated application is to be restarted, the data is moved from the save memory 228B to the work memory 228A to resume the state as it was before the stopping.

The terminal information acquisition block 229 acquires terminal information used to determine the priority of a coordinated application held in the cache memory 227 and supplies the obtained terminal information to the control block 221. The terminal information includes, for example, the usage history of the coordinated application.

If a plurality of coordinated applications exist, the control block 221 controls the cache memory 227 so as to preferentially record a coordinated application having a higher priority. To be more specific, based on information such as the TPT and AMT analysis results from the TPT/AMT analysis block 225, the terminal information from the terminal information acquisition block 229, and the cache capacity or free space capacity of the cache memory 227, the control block 221 controls the cache memory 227.

The reception apparatus 20 is configured as described above.

[Details of Trigger Information]

The following describes the configuration of trigger information in details with reference to FIG. 4.

Trigger information includes domain_name, segment_id, media_time, event_id, event_time, spread, and additional_information.

In domain_name, information indicative of a domain name for identifying a predetermined server is specified. For example, a domain name corresponding to the name of the provider of the TPT/AMT server 30 is specified.

In segment_id, an ID for identifying a segment (or a particular section) of broadcast content is specified. The provider can specify the ID freely.

In media_time, information indicative of a particular temporal position on the progression time axis of broadcast content is specified. For example, a time from a reference time such as a start time on the progression time axis of the broadcast content or a particular time, e.g., midnight (0:00) is specified in media_time. Times specified in media_time are in units of seconds or milliseconds.

In event_id, an ID for identifying a command identified by TPT and AMT is specified. In event_time, information indicative of a time at which the identified command is executed is specified.

In spread, information for stochastically dispersing timings at which trigger information is applied is specified.

In additional_information, additional information for use in controlling the operation of the coordinated application is specified.

Trigger information is configured as shown above.

[Detailed Configuration of TPT]

Next, the configuration of a TPT is described in details.

FIG. 5 shows one example of detailed specifications of a TPT. TPTs are written in a markup language such as XML (Extensible Markup Language), for example.

As shown in FIG. 5, TPT elements are written in the root elements of TPTs. In the TPT elements, information such as commands (or events) for controlling operation of a coordinated application is written.

The TPT elements include a protocolVersion attribute, id attribute, tptVersion attribute, updatingTime attribute, expireDate attribute, serviceId attribute, baseURL attribute, Capabilities element, LiveTrigger element, and Application element.

In the protocolVersion attribute, information indicative of the version of the specification defined in the TPT is specified. The version is composed of a major version and a minor version.

In the id attribute, an ID for identifying the TPT is specified. For example, in the id attribute, a character string formed by concatenating domain_name and program_id with "/" is specified. It should be noted that program_id corresponds to segment_id and is an ID capable of identifying broadcast content.

In the tptVersion attribute, information indicative of the version of the TPT is specified.

In the updatingTime attribute, information indicative of an update period is specified.

In the expireDate attribute, information indicative of a valid period of the TPT is specified.

In the serviceId attribute, an ID indicating in which of the services transmitted by being included in broadcast signals will a coordinated application be transmitted. For example, if a coordinated application is transmitted in NRT service, then the service_id of NRT service is specified.

It should be noted that NRT (Non-RealTime) service is a service that reproduces NRT content transmitted by use of a FLUTE (File Delivery over Unidirectional Transport) session after temporary storing it in storage of a receiver. When using NRT service, a coordinated application is transmitted instead of NRT content.

In the baseURL attribute, a URL which is a base of a URL specified by the TPT is specified. For example, in the baseURL, "http://xbc.com" is specified. Therefore, in the other URL specified by the TPT, only a relative path based on the base URL is required to be specified.

In the Capabilities element, information indicative of capabilities required for the reception apparatus 20 to control operation of a coordinated application using the TPT is specified. Namely, if the reception apparatus 20 has the capabilities specified in the Capabilities element, the reception apparatus 20 determines that the TPT is available. On the other hand, if the reception apparatus 20 does not have the specified capabilities, the TPT is ignored.

In the LiveTrigger element, which is a child element of the TPT element, there is written information associated with trigger information (hereafter referred to as live trigger information) for executing a command at a desired timing by a broadcaster when broadcasting content live. The LiveTrigger element includes a URL attribute, a deliveryType attribute, and a pollPeriod attribute.

In the URL attribute, a URL for accessing a trigger server (not shown) for providing live trigger information is written.

In the deliveryType attribute, rules for receiving live trigger information are specified. In the deliveryType attribute, "Streaming," "long polling," and "short polling" are specified.

In the poliPeriod attribute, a time indicative of an interval at which a trigger server is inquired for live trigger information is specified. This time is specified, for example, in units of seconds.

In the Application element, which is a child element of the TPT element, information associated with a coordinated application is written. The Application element includes an appId attribute, appName attribute, appType attribute, globalId attribute, appVersion attribute, testApp attribute, cookieSpace attribute, frequencyOfUse attribute, frequencyOfUpdate attribute, expireDate attribute, availInternet attribute, availBroadcast attribute, URL element, Capabilities element, ContentItem element, and Event element.

In the appID attribute, an ID for identifying the coordinated application is specified.

In the appType attribute, information associated with a file attribute or the like of the coordinated application is specified.

In the appName, information indicative of the name of the coordinated application is specified. For example, if a plurality of coordinated applications are launchable, the appName attribute presents the names of those coordinated applications to the user to let the user select a desired one and launch it.

In the globalId attribute, a URI (Uniform Resource Identifier) that can globally identify the coordinated application is specified.

In the appVersion attribute, information indicative of the version of the coordinated application is specified.

The testApp attribute is specified, for example, when the coordinated application is used for the purpose of product development testing. Therefore, in usual operations, the testApp attribute is ignored.

In the cookieSpace attribute, information indicative of the capacity of storage necessary for executing the coordinated application is specified.

In the frequencyOfUse attribute, information indicative of a frequency of use of the coordinated application is specified. For example, this frequency of use is specified in unit of time or day. A coordinated application having a high frequency of use can be preferentially cached.

In the frequencyOfUpdate attribute, information indicative of a frequency of update of the coordinated application is specified. For example, this frequency of update is specified in unit of time or day. A coordinated application having a high frequency of update can be preferentially cached.

In the expireDate attribute, information indicative of a valid period of the coordinated application is specified.

In the availInternet attribute, information indicative of whether the coordinated application is delivered via the Internet or not is specified.

In the availBroadcast attribute, information indicative of whether the coordinated application is delivered by broadcasting or not is specified.

In the URL element, a URL indicative of an acquisition source of the coordinated application is specified. For example, the URL of the application server 40 is specified in the URL element. Incidentally, for example, if "http://xbc.com" is specified as the base URL described above, then a character string subsequent to "/" after this URL is specified in the URL element.

In the Capabilities element, information indicative of capabilities required for the reception apparatus 20 to execute the coordinated application is specified. That is, if the reception apparatus 20 has capabilities specified in the Capabilities element, it determines that the coordinated application is executable.

In the ContentItem element, which is a child element of an Application element, information associated with caching of files (e.g., a HTML file and JPEG file) making up the coordinated application is written. The ContentItem element includes a URL element, an updatesAvail element, and a Size element.

In the URL attribute, the URL of a file to be cached is specified.

In the updatesAvail attribute, information concerning update of a file to be cached is specified.

In the Size attribute, information indicative of the size of a file to be cached is specified.

In an Event element, which is a child element of the Application element, information for controlling the operation of the coordinated application is written. The Event element includes an eventId attribute, a destination attribute, an action attribute, a diffusion attribute, and a data element.

In the eventId attribute, an ID for identifying a command (or an event) is specified.

In the destination attribute, a device to be controlled by the coordinated application according to the command is specified. Here, for example, if an external device (not shown) is connected to the reception apparatus 20 other than the reception apparatus 20, this external device is specified as the device to be controlled by the command.

For example, if the device to be controlled by the command is a high-definition television receiver, "HDTV (High Definition Television)" is specified in the destination attribute. If the device to be controlled by the command is a standard-definition television receiver, "SDTV (Standard Definition Television)" is specified in the destination attribute, and if the device to be controlled by the command is an external apparatus, then "external_1" or "external_2" is specified.

In the action attribute, for example, "register," "execute," "suspend," "terminate," or "stream-event" is specified.

Register is a command for specifying acquisition or registration of the coordinated application. Registration of the coordinated application here means to memorize an acquired coordinated application in association with the priority and valid period thereof.

Execute is a command for specifying acquisition or registration of a coordinated application. In addition, if the specified coordinated application is in a paused state, the Execute command restarts this coordinated application.

Suspend is a command for stopping and suspending an active coordinated command.

Terminate is a command for terminating an active coordinated application.

Stream-event is a command for firing an event in an active coordinated application.

It should be noted that, in addition to the commands mentioned above, "suspend-execute," "terminate-execute," and other commands may be specified in the action attribute.

Suspend-execute is a composite command in which an execute command for a target coordinated application and a suspend command for another coordinated application are combined. That is, if acquisition or activation of a target coordinated application and suspension of another coordinated application are instructed, "suspend-execute" is specified in the action attribute.

Terminate-execute is a composite command in which an execute command for a target coordinated application and a terminate command for another coordinated command are combined. That is, if acquisition or activation of a target coordinated application and termination of another coordinated application are instructed, "terminate-execute" is specified in the action attribute.

In the diffusion attribute, information for stochastically dispersing timings at which commands are applied in the reception apparatus 20 is specified. Setting this information, when a plurality of reception apparatuses 20 are to acquire coordinated applications from the application server 40, access by these reception apparatuses 20 can be dispersed without concentrating at a particular time.

In the data element, data to be referred to at the time of firing the event is specified when the command is a stream-event command.

TPT is configured as described above.

It should be noted that the specifications of TPT described with reference to FIG. 5 are illustrative only, and other specifications are also applicable.

[Detailed Configuration of AMT]

The following describes a detailed configuration of AMT.

FIG. 6 shows one example of detail specifications of AMT. AMT is written in a markup language such as XML for example.

As shown in FIG. 6, the root element of an AMT is an AMT element. In the AMT element, information such as a valid period of a command (or an event) for controlling operation of a coordinated application is written.

The AMT element includes a protocolVersion attribute, a segmentId attribute, a beginMT attribute, and an Activation element.

In the protocolVersion attribute, information indicative of the version of specifications defined in the ATM is specified. The version is made up of a major version and a minor version.

In the segmentId attribute, an ID corresponding to the id attribute of TPTs is specified. With this ID, a TPT corresponding to the AMT is identified. For example, a character string composed of domain_name and program_id concatenated with "/" is specified in the segmentId attribute.

In the beginMT attribute, information indicative of a start time of a time range of the target segment (particular section) is specified.

In the Activation element, which is a child element of the ATM element, information for identifying a command for a coordinated application is written. The Activation element includes a targetId attribute, a startTime attribute, and an endTime attribute.

In the targetId attribute, an ID for identifying a command for a coordinated application written in a TPT is specified. For example, a combination of an ID specified in a TPT in the appID attribute of its Application element and an ID specified in the eventId attribute of the Event element is specified in the targetId.

In the startTime attribute, information indicative of a start time of the valid period of the command identified by the targetId attribute is specified.

In the endTime attribute, information indicative of an end time of the valid period of the command identified by the target attribute is specified.

To be more specific, a valid period of a command is defined by the startTime attribute and the endTime attribute which indicate two points on the progress time axis of the corresponding broadcast content. For example, in the reception apparatus 20, when the time indicated by the media clock passes a valid period start time indicated by a startTime attribute, a command corresponding to this valid period start time becomes valid. However, in this case, only the startTime attribute may be specified without specifying the endTime attribute.

Alternatively, it may also be configured such that a command corresponding to a valid period is valid when a time indicated by the media clock is within the valid period, and the command corresponding to the valid period is invalid when a time indicated by the media clock has not reached or has passed the valid period.

In other words, in the reception apparatus 20, when a time indicated by the media clock satisfies a predetermined valid condition based on a valid time or a valid period, a command corresponding to the valid condition becomes valid.

The AMT is configured as described above.

It should be noted that the specifications of an AMT described above with reference to FIG. 6 is illustrative only, and other specifications are may be adopted.

[Cache Control of Coordinated Application]

The following describes the cache control of a coordinated application held in the cache memory 227 with reference to FIG. 7 to FIG. 13.

(General Idea of Caching of Coordinated Application)

Figure 7:
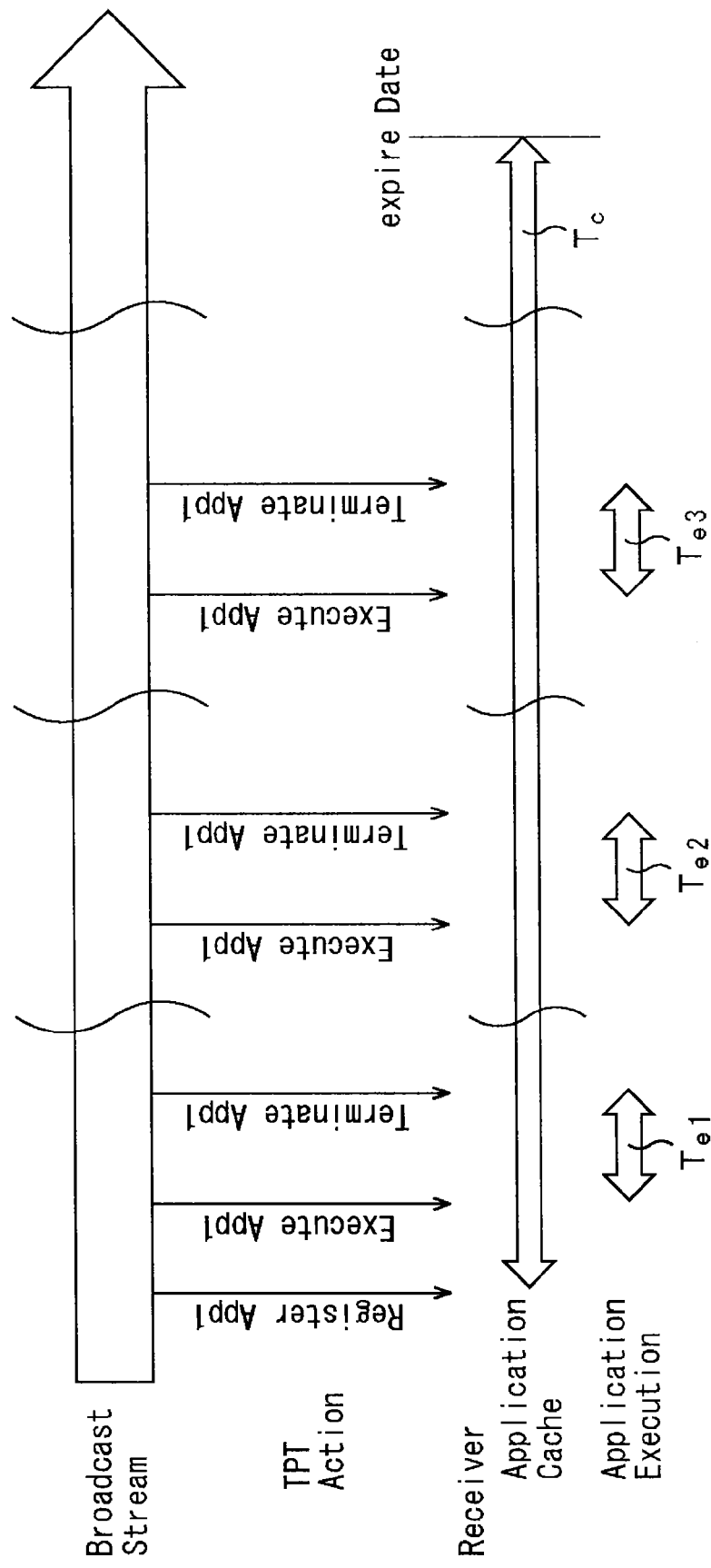
FIG. 7 is a diagram illustrating the general idea of the caching of coordinated applications.

FIG. 7 shows a concept of the caching of a coordinated application.

In the reception apparatus 20, when trigger information from the transmission apparatus 10 is extracted, the media clock is set or calibrated based on media_time included in the trigger information. In addition, when domain_name or segment_id included in trigger information changes, the reception apparatus 20 acquires a TPT and AMT from the TPT/AMT server 30 and holds them.

The reception apparatus 20 refers to the TPT and AMT and identifies a valid command when, for example, the time indicated by the media clock first enters the valid period of the command.

In the example shown in FIG. 7, a register command is first identified, so the reception apparatus 20 acquires a coordinated application App1 from the application server 40 and registers it. At this time, the obtained coordinated application App1 is held in the cache memory 227. Subsequently, an execute command is identified, so the coordinated application Appl1 held in the cache memory 227 is launched.

Then, when a terminate command is identified, the active coordinated application App1 is terminated. In other words, it can be said that a coordinated application App1 is active during a time period $T_{e1}$, from its launch in response to an execute command to its termination in response to a terminate command.

It should be noted that the coordinated application App1 is kept held in the cache memory 227 even after passing the period $T_{e1}$ until a validity period (expireDate) expires.

Then, when the coordinated application App1 is to be executed again at another timing, an execute command corresponding to the coordinated application App1 is identified. At this time, since the coordinated application App1 is held in the cache memory 227 upon its last launching, the coordinated application App1 held in the cache memory 227 is read out and launched.

In addition, a coordinated application App1 is executed during a period $T_{e2}$ until a terminate command is identified, and when a terminate command is identified, the active coordinated application App1 is terminated.

Subsequently, until the validity period of the coordinated application App1 expires, the coordinated application App1 held in the cache memory 227 is read out to be executed every time an execute command corresponding to the coordinated application App1 is identified.

When the validity period of the coordinated application App1 expires, the coordinated application App1 held in the cache memory 227 is deleted. In other words, a coordinated application App1 continues to be held in the cache memory 227 during a period $T_c$ from its acquisition in response to a register command to the expiration of its validity period.

The cache control of coordinated applications is executed as described above.

(Cache Control According to Priority)

Figure 8:
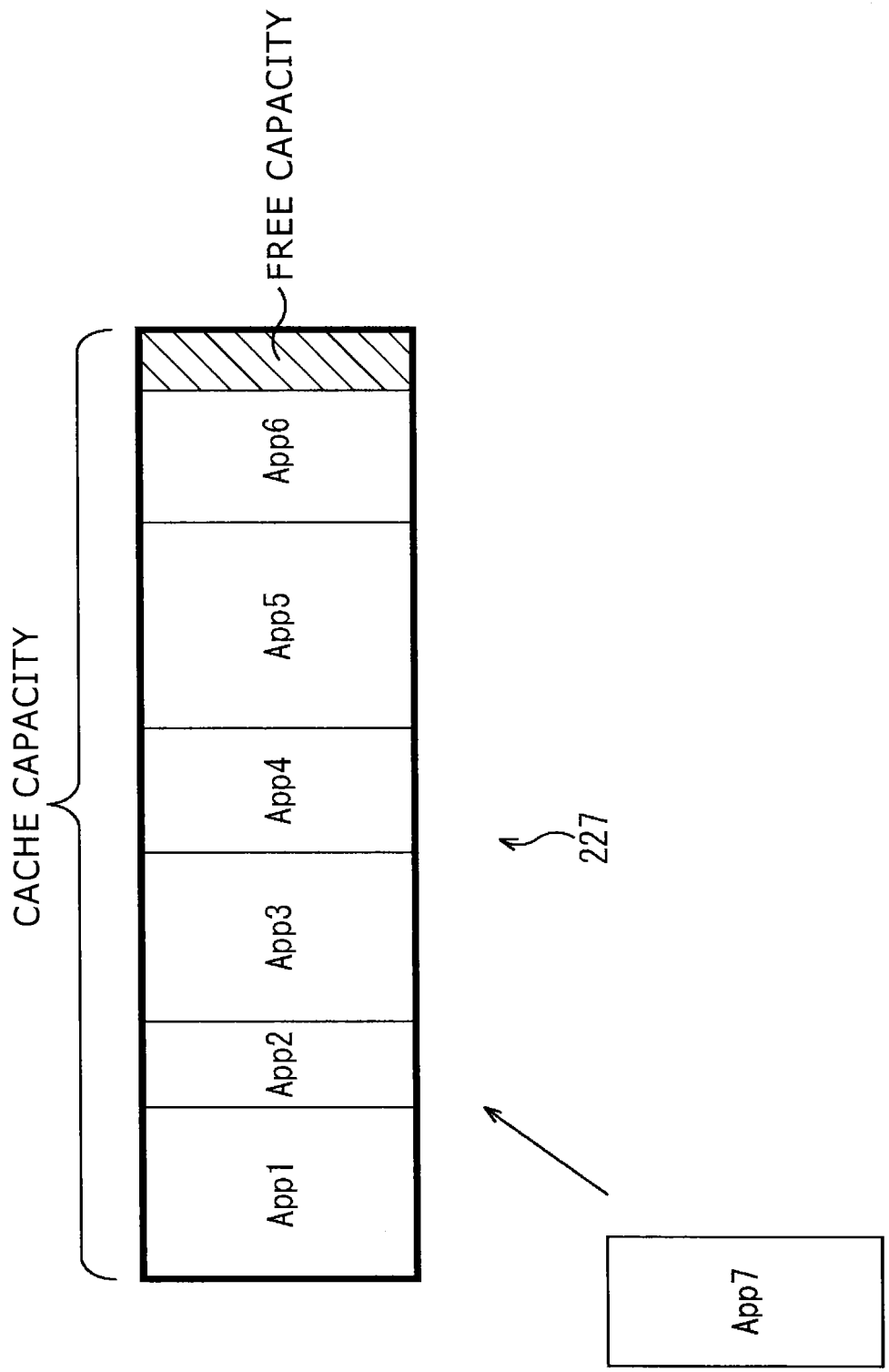
FIG. 8 is a diagram illustrating controlling of caching in accordance with the priority.

The following describes cache control in accordance with priorities with reference to FIG. 8.

In the reception apparatus 20, a case where a plurality of coordinated applications are executed is assumed. Because the cache capacity of the cache memory 227 is limited, all coordinated applications cannot be held. Accordingly, caching is controlled in such a manner that coordinated applications having higher priories are preferentially cached and coordinated applications having low priories are preferentially deleted, thereby ensuring cache capacity.

In the example shown in FIG. 8, the rectangle enclosed by thick lines represents the cache capacity of the cache memory 227. Six squares arranged in the rectangle each represent a capacity of an obtained coordinated application. The larger the area of the square, the higher the capacity, and the smaller the area of the square, the lower the capacity.

For example, the cache memory 227 holds coordinated applications App1 to App6. The free capacity of the cache memory 227 is derived by subtracting the total capacity of the coordinated applications App1 to App6 from the cache capacity of the cache memory 227.

At this time, when a coordinated application App7 is acquired, the coordinated application App7 is to be held in the cache memory 227. However, because the capacity of the coordinated application App7 is larger than the free space of the cache memory 227, it cannot be held in the cache memory 227 due to capacity shortage.

It is therefore necessary to ensure capacity for holding the coordinated application App7, but simply deleting the coordinated application App1 held first is not a proper approach because the coordinated application App1 may need to be obtained again if the coordinated application App1 is high in frequency of use. On the other hand, for example, if the coordinated application App2 is deleted, it is not suitable because the created space and the free space will not add up to a capacity enough for holding the coordinated application App7.

In order to solve this problem, cache control in accordance with priority is executed in the reception apparatus 20 to prioritize the coordinated applications held in the cache memory 227, so that coordinated applications with lower priorities are deleted preferentially and those with higher priorities are held preferentially.

The following descries details of the cache control in accordance with priorities that is executed in the reception apparatus 20.

(Frequency of Use)

Figure 9:
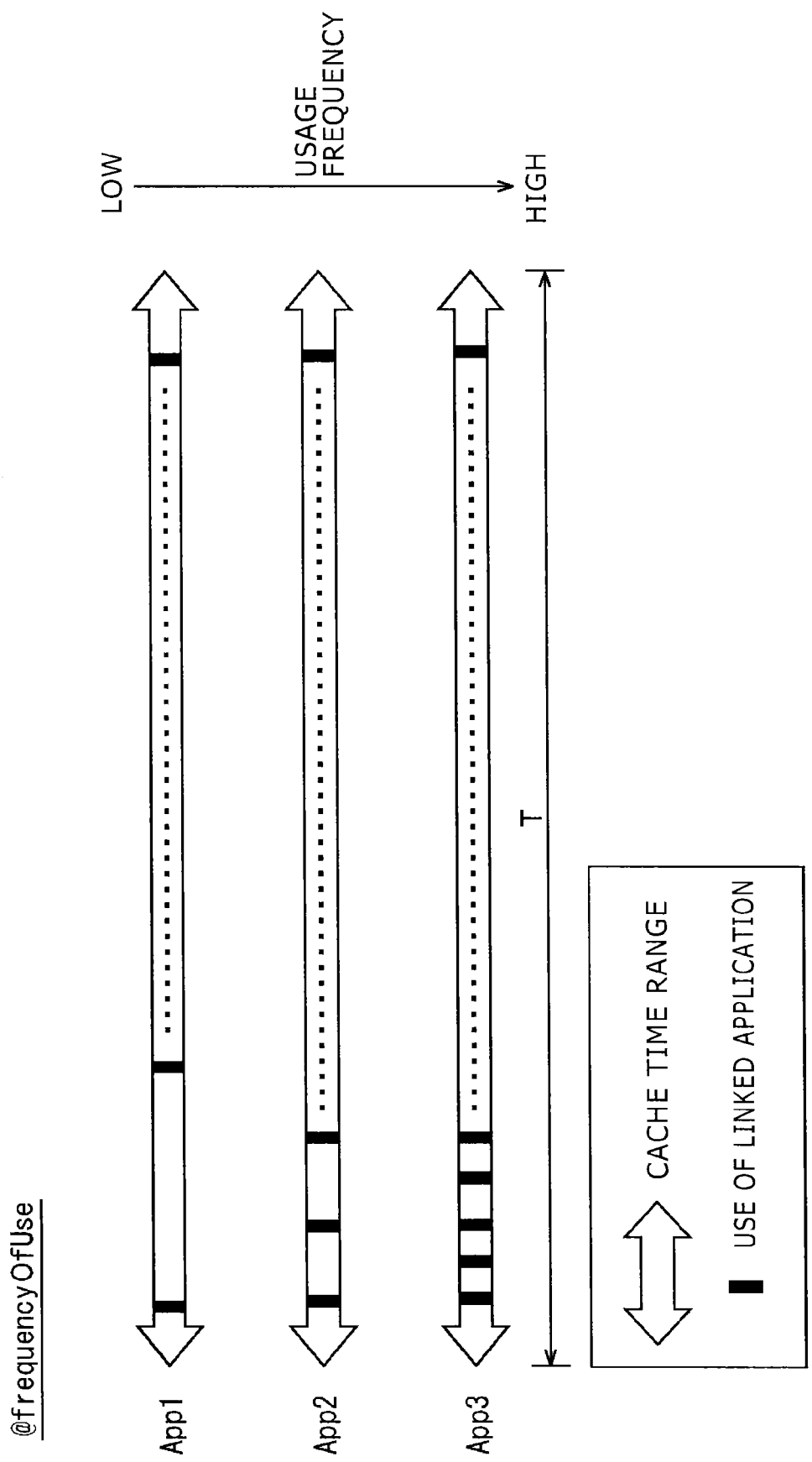
FIG. 9 is a diagram illustrating a method of setting priority based on the usage frequencies of coordinated applications.

FIG. 9 shows a diagram illustrating a method for setting priority based on the use frequency of coordinated applications specified in frequencyOfUse in TPTs as described above.

In FIG. 9, the use frequencies of coordinated applications App1, App2 and App3 are represented by the number of times they were used in a television program broadcast from a broadcasting station in a time range T in which they were cached. For example, if T=1 month, the coordinated application App1 is used once a week. Likewise, the coordinated application App2 is used once every other day and the coordinated application App3 is used every day.

Thus, in the example shown in FIG. 9, the frequency of use goes up in the order of the coordinated applications App3, App2, and App1, so if caching priority is given in the descending order of the use of frequency, a coordinated application with higher priority can be preferentially held in the cache memory 227.

(Frequency of Update)

Figure 10:
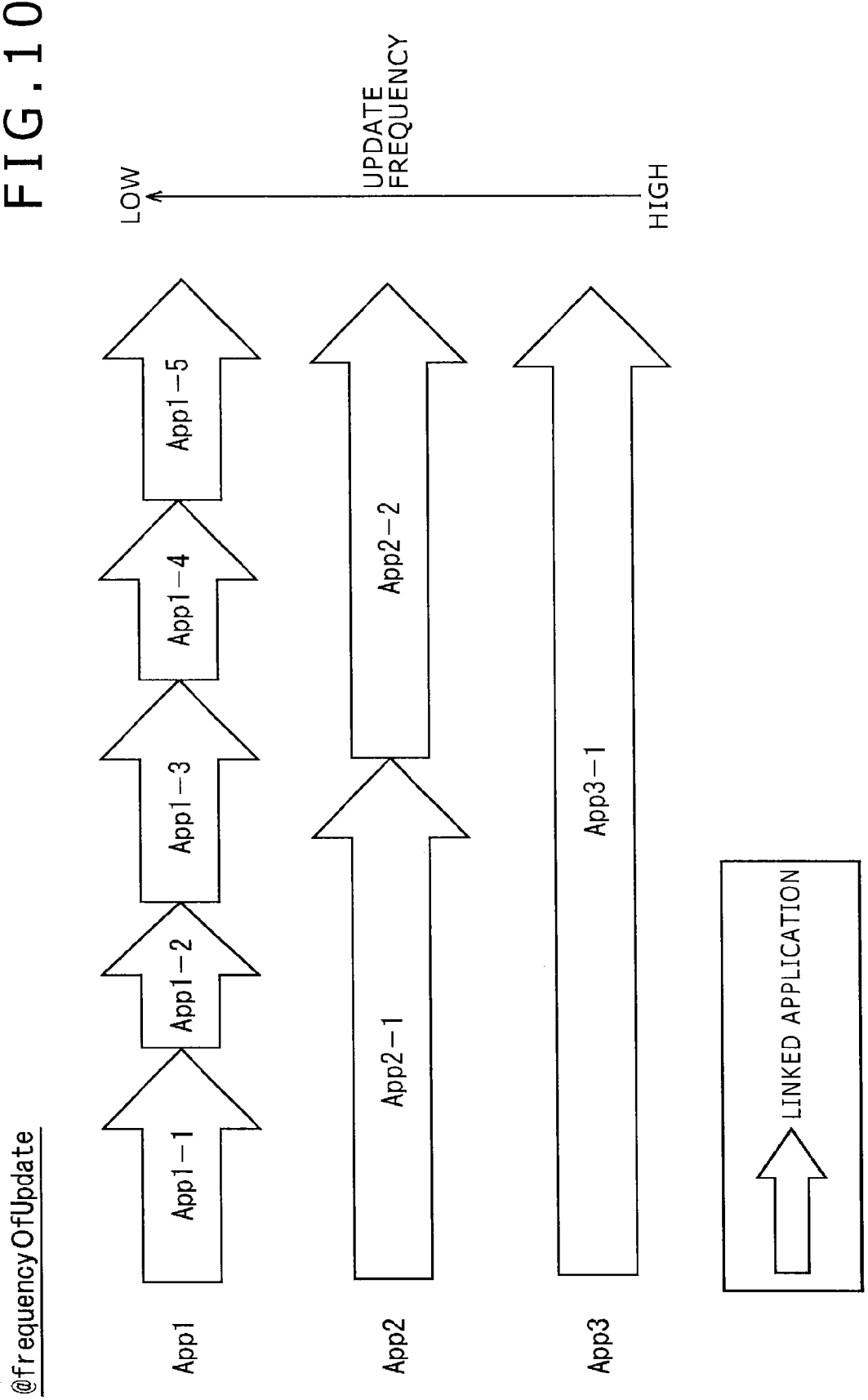
FIG. 10 is a diagram illustrating a method of setting priority based on the update frequencies of coordinated applications.

FIG. 10 shows a method for setting priority based on the frequency of update of coordinated applications which is specified in frequencyOfUpdate in TPTs as described above.

In FIG. 10, the update frequencies of coordinated applications App1, App2, and App3 are represented by the number of times each of the coordinated applications were updated within a certain period of time. For example, the coordinated application App1 was updated 4 times in the order of App1-1, App1-2, App1-3, App1-4, and App1-5 within a certain period of time. Within the same period of time, the coordinated application App2 was updated only once from App2-1 to App2-2, and the coordinated application App3 remained to be App3-1 and was not updated.

Upon updating, the appID of a TPT acquired afterward does not change but the appVersion changes. As a result, even if a coordinated application corresponding to the appID is cached in the reception apparatus 20, a coordinated application of the new appVersion needs to be acquired from the application server 40 again. Accordingly, it is ineffective to cache a coordinated application having a high update frequency.

In the example shown in FIG. 10, the update frequency goes lower in the order of the coordinated applications App3, App2, and App1, so if higher caching priorities can be set in the ascending order of these update frequencies, then a coordinated application having a higher priority can be preferentially held in the cache memory 227.

(Business Entity Preferred Applications)

When business entities providing coordinated applications are to provide a plurality of coordinated applications, they may want to operate the system by raising the priority of a particular coordinated application.

Figure 11:
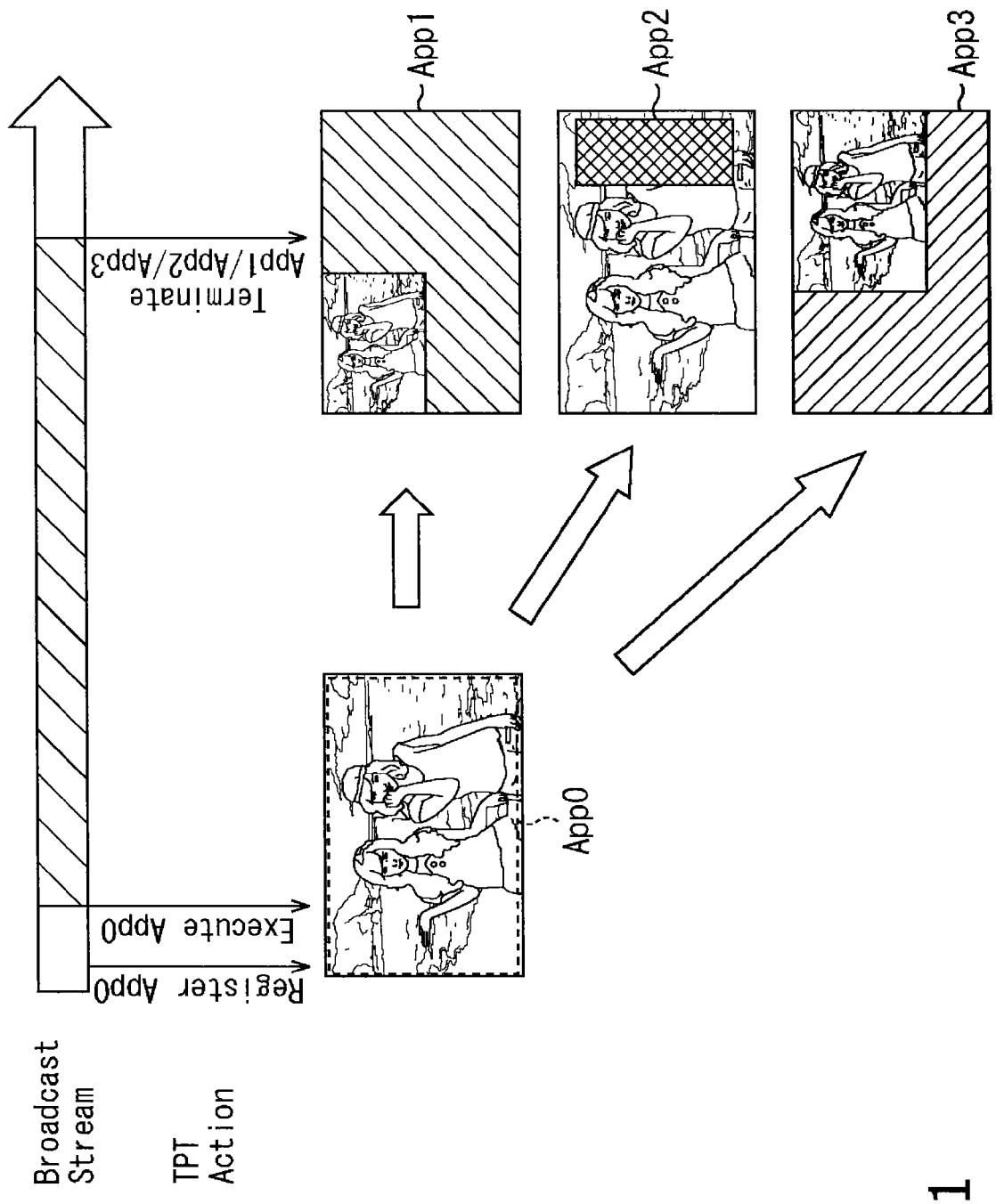
FIG. 11 is a diagram illustrating a business entity preferred application.

For example, as shown in FIG. 11, it is assumed that in the reception apparatus 20, when a coordinated application App0 is launched in response to a register command and an execute command, any one of the coordinated applications App1, App2, and App3 can be executed from the coordinated application App0.

In the example shown in FIG. 11, the coordinated application App0 is executed in a non-display mode, so only the video of a television program is displayed on the screen. If the user presses a predetermined button on a remote controller (not shown), the coordinated application App1 is obtained and launched.

Figure 12:
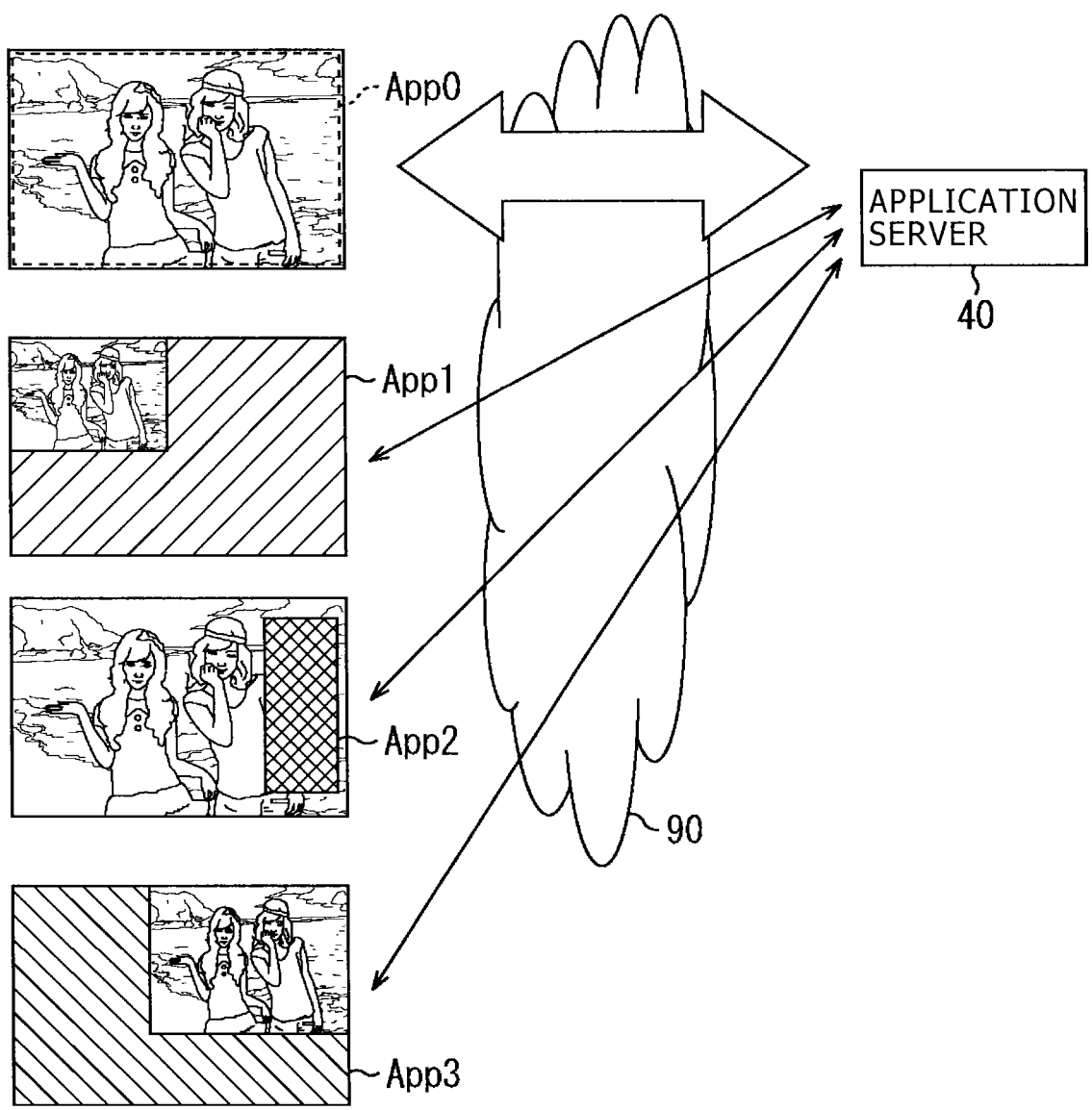
FIG. 12 is a diagram illustrating communications traffic of when coordinated applications are obtained.

At this time, comparing the traffic over the Internet 90 from when the coordinated application App0 is obtained from the application server 40 to when the coordinated application App1 is obtained, as shown in FIG. 12, it is supposed that the communication traffic at the peak time is overwhelmingly larger when the coordinated application App1 is obtained than that of when the coordinated application App0 is obtained. The same holds between the relationships between the coordinated application App0 and the coordinated applications App2 and App3.

To be more specific, the coordinated application App0 is acquired from the application server 40 when a register command and an execute command are identified based on a time indicated by the media clock. Therefore, many reception apparatuses 20 receiving the same broadcast content access the application server 40 at almost the same timing. Consequently, the traffic over the Internet 90 increases and, at the same time, the load on the application server 40 increases.

On the other hand, the coordinated applications App1, App2, and App3 are acquired from the application server 40 at given timings in accordance with an operation done by the user. Therefore, even if a number of reception apparatuses 20 are receiving the same broadcast content, the timings of operations by the terminals' users differ from one another, so that the reception apparatuses 20 access the application server 40 in a dispersed manner. This prevents the traffic over the Internet 90 from increasing, and at the same time, removes the load on the application server 40.

As described above, acquisition of the coordinated application App0 involves increase of communication traffic and increase of load on the application server 40, so once the coordinated application App0 is obtained, it is desirable to preferentially cache the obtained coordinated application App0 to reuse it. In addition, business entities can be aware of such coordinated application App0 in advance. If a business entity sets the caching priority of the coordinated application App0 high, the coordinated application App0 can be preferentially held in the cache memory 227.

In the following, such coordinated application App0 as described above is referred to as a business entity preferred application in order to distinguish it from other coordinated applications.

It should be noted however that, basically, one business entity sets one coordinated application as a business entity preferred application, so that the business entity preferred application can be identified by giving a particular ID or setting a flag indicative of a business entity preferred application. As the particular ID, "0" may be specified for appID, or if globalId is specified by a URL, "0" may be specified at a predetermined position in the character string subsequent to "/" following the domain name.

In addition, because business entity preferred applications are provided by a plurality of entities, it is assumed that the reception apparatus 20 holds a plurality of business entity preferred applications of the entities.

Figure 13:
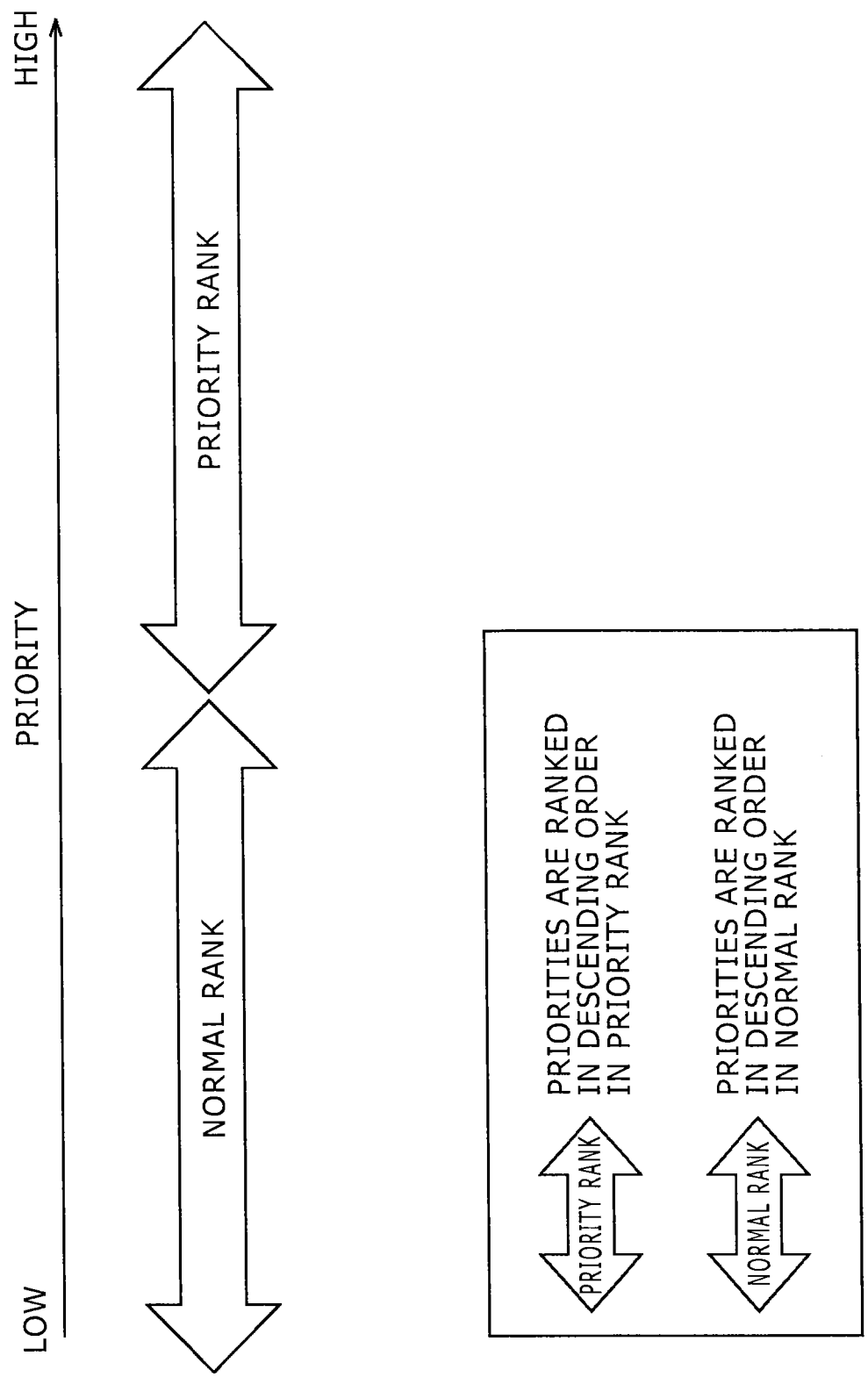
FIG. 13 is a diagram illustrating a priority rank and a normal rank.

Further, as shown in FIG. 13, in executing cache control in accordance with priority, a preferred rank and a normal rank are arranged. Business entity preferred applications belong to the preferred rank while other coordinated applications belong to the normal rank.

To be more specific, the business entity preferred applications belong to the preferred rank and the coordinated applications belong to the normal rank, and in each of the groups, the applications are ranked in the order of descending priorities. The business entity preferred applications which belong to the preferred rank are ranked such that their priority is always higher than those of the coordinated applications which belong to the normal rank.

Accordingly, all business entity preferred applications will always be cached preferentially to the coordinated applications.

As described above, in the reception apparatus 20, caching is controlled according to a predetermined frequency such as frequency of use or update and priority that are specified in TPTs by business entities, so that coordinated applications having higher priority are preferentially recorded to the cache memory 227. As a result, caching of coordinated applications is properly controlled, thereby preferentially caching coordinated applications that are high in the possibility of being reused.

It should be noted that, the information used to calculate priority do not need to be those specified in TPTs by business entities as described above, and terminal information obtained on the side of the reception apparatus 20 may also be used. As the terminal information, for example, information indicative of a use history of the coordinated application, and the cache capacity or free capacity of the cache memory 227 may be used.

[Contents of Specific Processing Executed in Each Apparatus]

The following describes the contents of the specific processing executed in each of the apparatuses making up the broadcasting-communication coordinated system 1 with reference to the flowcharts shown in FIG. 14 to FIG. 17.

(Transmission Processing)

Figure 14:
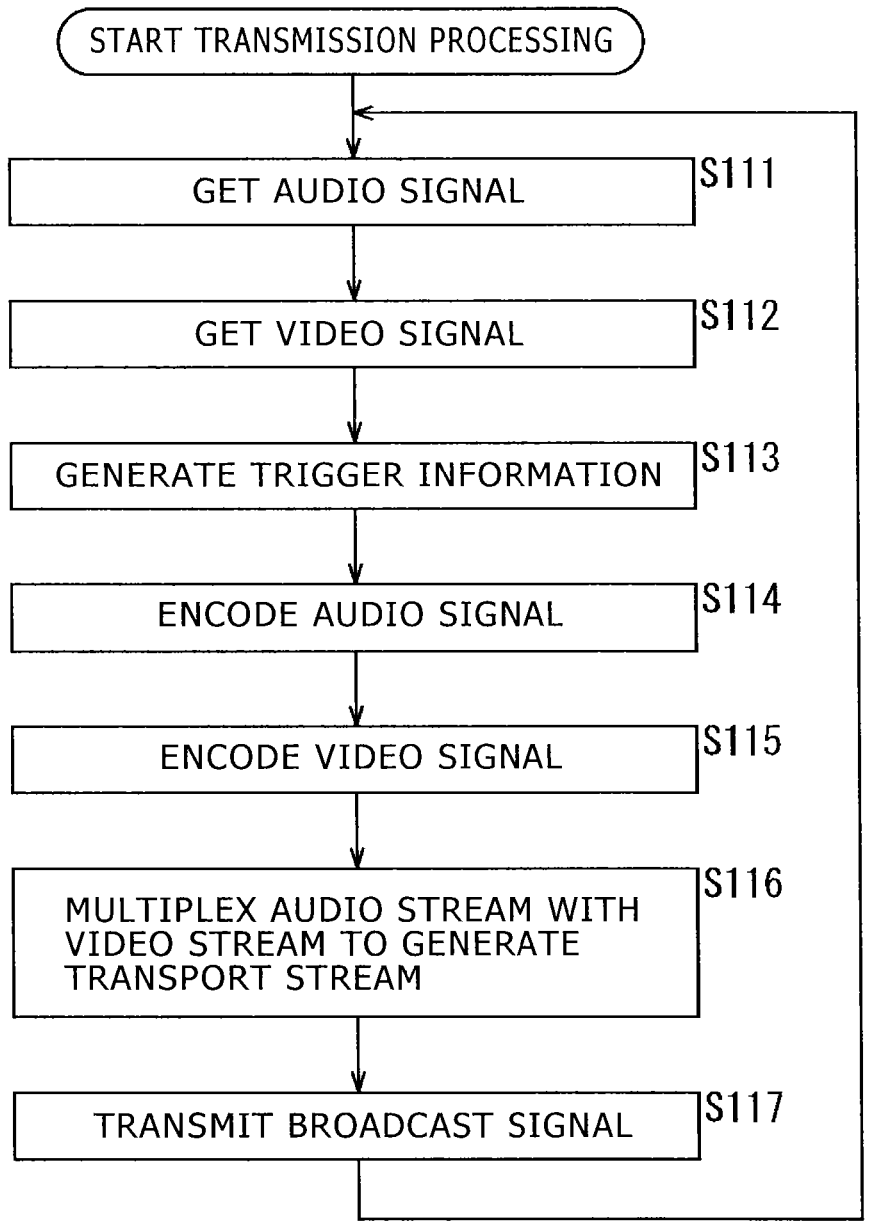
FIG. 14 is a flowchart indicative of transmission processing.

First, the transmission processing executed by the transmission apparatus 10 is described with reference to the flowchart shown in FIG. 14.

In step S111, the audio acquisition block 111 acquires an audio signal corresponding to the audio of broadcast content from an external server or the like. In step S112, the video acquisition block 113 acquires a video signal corresponding to the video of broadcast content from an external server or the like.

In step S113, the trigger information generation block 114 generates trigger information according to the progression of the video of broadcast content corresponding to the video signal obtained by the video acquisition block 113.

In step S114, the audio encoder 112 encodes the audio signal obtained by the audio acquisition block 111.

In step S115, the video encoder 115 encodes the video signal obtained by the video acquisition block 113. In addition, the video encoder 115 sets the trigger information in the subtitle data in the user data area of the video stream obtained by the encoding.

In step S116, the multiplexing block 116 multiplexes the audio stream encoded by the audio encoder 112 and the video stream encoded by the video encoder 115 to generate a transport stream.

In step S117, the transmission block 117 transmits the transport stream generated by the multiplexing block 116 as a broadcast signal via the antenna 118. Then, the process returns to step S111 and the succeeding steps are repeated.

The description of the transmission processing has been completed.

(Reception Processing)

Figure 15:
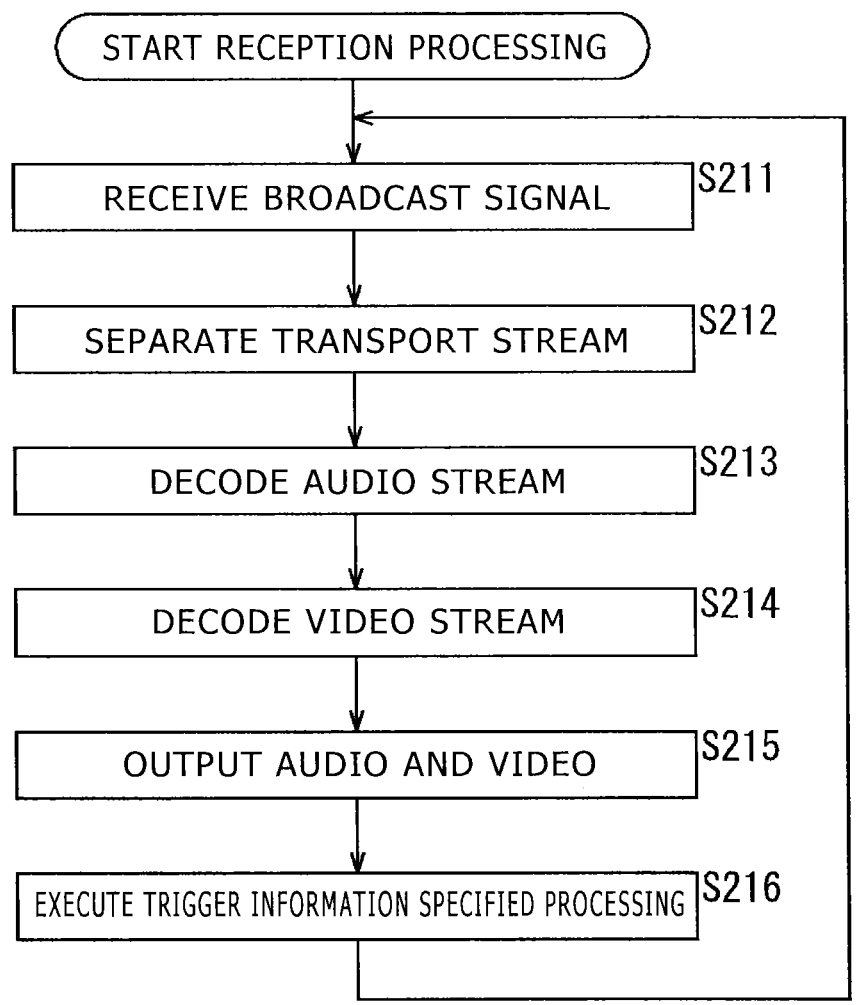
FIG. 15 is a flowchart indicative of reception processing.

The following describes the reception processing executed by the reception apparatus 20 with reference to the flowchart shown in FIG. 15.

In step S211, the tuner 212 receives a broadcast signal via the antenna 211 and demodulates the broadcast signal.

In step S212, the demultiplexing block 213 separates the transport stream demodulated by the tuner 212 into an audio stream and a video stream.

In step S213, the audio decoder 214 decodes the audio stream separated by the demultiplexing block 213 to generate an audio signal.

In step S214, the video decoder 217 decodes the video stream separated by the demultiplexing block 213 to generate a video signal.

In step S215, the loudspeaker 216 outputs audio corresponding to the audio signal. The display 219 displays video corresponding to the video signal.

As a result, the video of the broadcast content such as a television program is displayed on the display 219 and the audio corresponding to the video is outputted from the loudspeaker 216.

In step S216, trigger information specified processing is executed by the component blocks of the trigger information extraction block 220 to the application memory 228.

Specifically, trigger information specified processing is executed as follows.

When trigger information is extracted by the trigger information extraction block 220, the control block 221 sets or calibrates the media clock. In addition, if the control block 221 judges to acquire a TPT and AMT according to the extracted trigger information, the control block 221 controls the communication I/F 224 to acquire the TPT and AMT from the TPT/AMT server 30. The acquired TPT and AMT are analyzed by the TPT/AMT analysis block 225 and held in the memory.

Next, the control block 221 refers to the TPT and AMT to identify a valid command when a predetermined condition is satisfied, for example, when the time indicated by the media clock enters the valid period of the command.

For example, when the identified command is a register command, the application engine 226 controls the communication I/F 224 to acquire a coordinated application from the application server 40 and registers the coordinated application. When the identified command is an execute command, the application engine 226 launches the coordinated application already acquired.

After that, in the reception apparatus 20, when a stream event command is identified, the event for the active coordinated application is fired. In the reception apparatus 20, when a suspend command is identified, the active coordinated application is suspended. Further, when an execute command is identified, the suspended coordinated application is restarted.

In addition, in the reception apparatus 20, when a terminate command is identified, the active coordinated application is terminated.

When the trigger information specified processing of step S216 is completed, the process returns to step S211 and the succeeding steps are repeated.

The description of the reception processing has been completed.

(Cache Control Processing)

Figure 16:
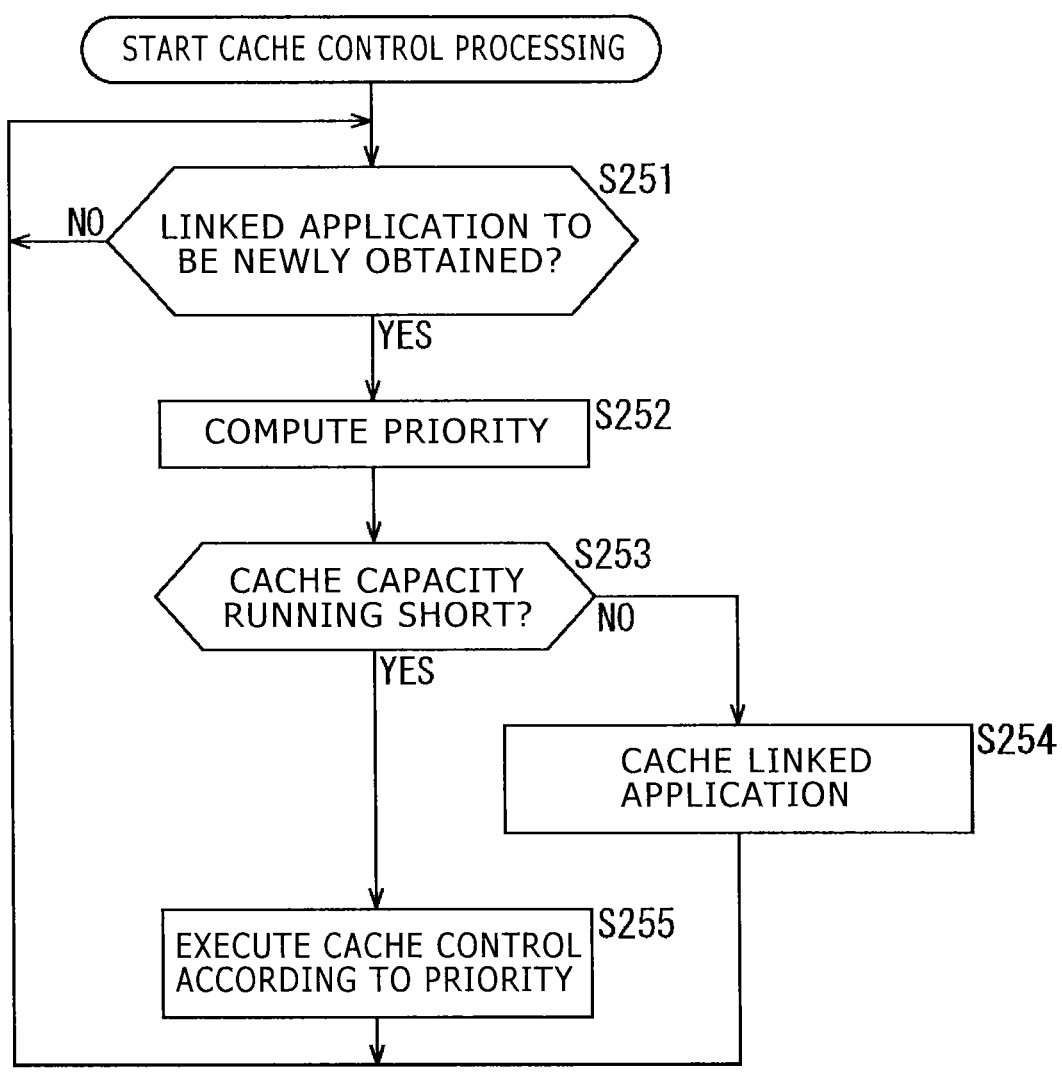
FIG. 16 is a flowchart indicative of cache control processing.

The following describes the cache control processing executed by the reception apparatus 20 with reference to the flowchart shown in FIG. 16.

In step S251, the control block 221 determines whether or not a coordinated application is newly obtained. When a coordinated application is newly obtained, the process proceeds to step S252.

In step S252, the control block 221 computes the priority of the newly obtained coordinated application. The specific computation method will be described later with reference to FIG. 17. In this example, it is assumed that the priority of the coordinated applications already held in the cache memory 227 have been computed beforehand.

In step S253, the control block 221 checks the free capacity of the cache memory 227 for the capacity of the newly obtained coordinated application, and determines whether or not the cache capacity is short.

In step S253, when the cache capacity is found not to be short, the process proceeds to step S254. In this case, it is possible to immediately hold the coordinated application into the cache memory 227, so the cache memory 227 caches the newly obtained coordinated application under the control of the control block 221 (step S254).

On the other hand, when the cache capacity is found to be short in step S253, then the process proceeds to step S255. In this case, the coordinated application cannot be immediately cached in the cache memory 227, so the control block 221 executes cache control in accordance with the priority.

To be more specific, as shown in FIG. 8, if the capacity of the newly obtained coordinated application is larger than the free capacity of the cache memory 227, the capacity is short and the coordinated application cannot be cached in the cache memory 227. Therefore, the control block 221 deletes a coordinated application with lower priority from the cache memory 227.

When the coordinated application with lower priority is deleted, if the sum capacity of the space obtained thereby and the original free space is still not enough for caching the newly obtained coordinated application, then a coordinated application whose priority is the second lowest may be deleted. Alternatively, it is also possible to delete a coordinated application with the lowest priority among those that can provide a free capacity enough for caching a newly obtained coordinated application.

Then, when a free capacity enough for caching the newly obtained coordinated application is ensured, the application is cached in the free capacity.

When step S254 or S255 finishes, the process returns to step S251 and the succeeding steps are repeated.

As described above, in the cache control processing shown in FIG. 16, the control block 221 controls caching in accordance with the priority, thereby preferentially caching coordinated applications that are high in the possibility of reuse.

The description of the cache control processing has been completed.

(Method for Computing Priority)

Figure 17:
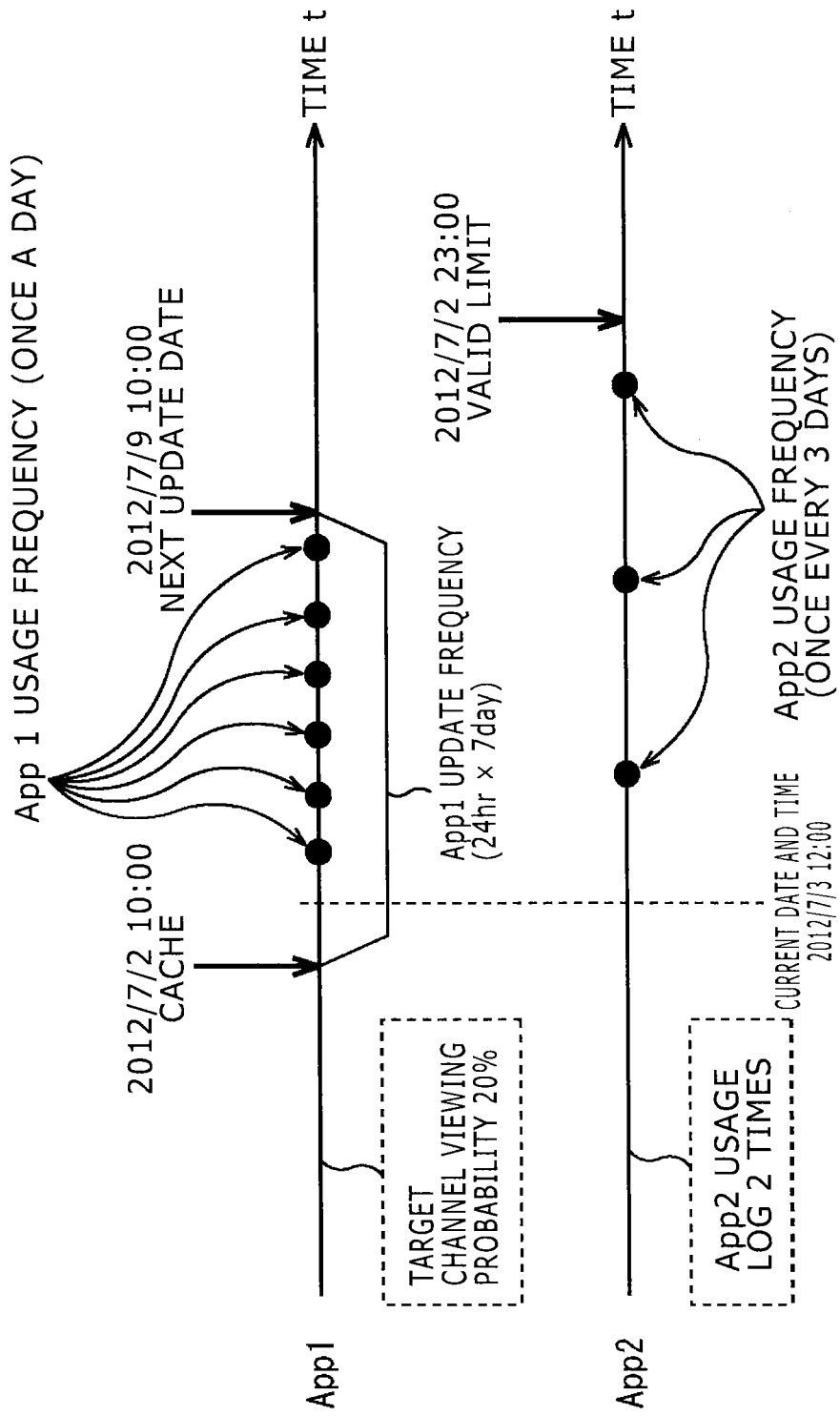
FIG. 17 is a diagram illustrating a specific example of a method for calculating priority.

The following describes a specific example of the method for computing priority with reference to FIG. 17.

In the example shown in FIG. 17, a method for computing the priorities of coordinated applications App1 and App2 is described.

Because an update frequency (for example, the update period is 7 days (24 hours×7 days)) is specified for the coordinated application App1, the next update date is to be predicted. For example, even if the next update date after Jul. 1, 2012 is Jul. 8, 2012, the reception apparatus 20 does not know the last update date before caching the coordinated application and therefore cannot predict the next update date.

Therefore, the next update date may be predicted from the date the application was cached. For example, if the update period is 7 days (24 hours×7 days) and the coordinated application App1 is cached at 10:00 of Jul. 2, 2012, the next update date will be 10:00 of Jul. 9, 2012.

Assuming that the current date is 12:00, Jul. 3, 2012, the maximum usage count from that date to the next update date (10:00, Jul. 9, 2012) is predicted based on the frequency of use. For example, if the frequency of use is specified once every day, it is supposed that the application would be used 6 times in about 6 days, so that 6 times is predicted as the maximum usage count.

The 6 times calculated as the maximum usage count is an estimate based on a value specified by a business entity in advance, so that it is desirable to obtain a more accurate final priority by use of a valid probability obtained from terminal information. For example, the usage count of the coordinated application App1 obtained from the use log, or the viewing probability of the channel of the broadcast content with which the coordinated application App1 is executed may be used as the valid probability. The final priority is calculated by multiplying the valid probability by the maximum usage count.

For example, if the coordinated application App1 has not been used before and its usage count is 0, and the viewing probability of the target channel is 20%, then the valid probability is 0.2, so that the priority is calculated to be 1.2 (6×0.2).

On the other hand, no update frequency is specified for the coordinated application App2, so that the maximum usage count from the current date to the expiring date (expireDate) is predicted by use of the frequency of use.

For example, if the current date is 12:00, Jul. 3, 2012 and the expiring date is 23:00, Jul. 12, 2012, and the frequency of use is specified as once every three days, it is supposed that the application is used 3 times in about 9 days, so that 3 times is predicted as the maximum usage count.

The coordinated application App2 has been used twice in the past and therefore the valid probability is 1.0. The priority is calculated to be 3.0 (3×1.0).

Incidentally, although only the methods for computing the priorities of the coordinated applications App1 and App2 have been described of the coordinated applications held in the cache memory 227 for the convenience of description, the priorities of other coordinated applications are also computed similarly.

Then, the control block 221 controls caching such that the coordinated applications having higher priorities are left in the cache memory 227 and the coordinated applications having lower priorities are deleted from the cache memory 227.

For example, in the example shown in FIG. 17, the priorities of the coordinated applications App1 and App2 are calculated to be 1.2 and 3.0, respectively, so that the coordinated application App2 is preferentially cached.

It should be noted however that, as described above, if the coordinated application App2 is a business entity preferred application, then the coordinated application App2 is preferentially cached. On the other hand, if the coordinated application App1 is a business entity preferred application and the coordinated application App2 is not, then the coordinated application App1 is preferentially cached.

It should also be noted that the priority computation method shown in FIG. 17 is illustrative only and the priorities may be computed by other methods. That is to say, priorities may be computed by calculating a predetermined arithmetic expression using information obtained from TPTs such as frequency of use and frequency of update and information obtained from terminals.

Coordinated applications are not limited to those executed in coordination with broadcast content. For example, coordinated applications may be executed in coordination with such AV (Audio Visual) content as communication content that is delivered by VOD (Video On Demand) via the Internet 90.

In the above description, coordinated applications are Internet-distributed. It is also possible to transmit coordinated applications by the transmission apparatus 10 by including them in broadcast signals. In this case, the reception apparatus 20 acquires a coordinated application from the transmission apparatus 10 in accordance with an identified command and controls the operation of the obtained coordinated application.

In the above description, the operation of a coordinated application is controlled by use of a TPT and AMT. However, the reception apparatus 20 may control the operation of a coordinated application without acquiring a TPT and AMT. In that case, the reception apparatus 20 controls the operation of the coordinated applications according to trigger information from the transmission apparatus 10.

In the above description, TPTs and AMTS are Internet-distributed. However, it is also possible to transmit TPTs and AMTS by including them in broadcast signals from the transmission apparatus 10. In this case, the reception apparatus 20 acquires a TPT and AMT multiplexed into a broadcast signal transport stream, and controls the operation of the coordinated application by using the obtained TPT and AMT.

In the above description, trigger information is transmitted from the transmission apparatus 10. However, it is also possible to employ an ACR (Automatic Content Recognition) server that uses the ACR technology to generate trigger information corresponding to the feature quantity of broadcast content supplied from the reception apparatus 20, and thereby provide the trigger information.

[Description of Computer to Which the Present Technology is Applied]

The above-mentioned sequence of process may be executed by software as well as hardware. When the above-mentioned sequence of process is to be executed by software, the programs constituting the software are installed in a computer. The computer may be, for example, a computer built in dedicated hardware or a general-purpose personal computer that can execute various functions by installing programs for them.

Figure 18:
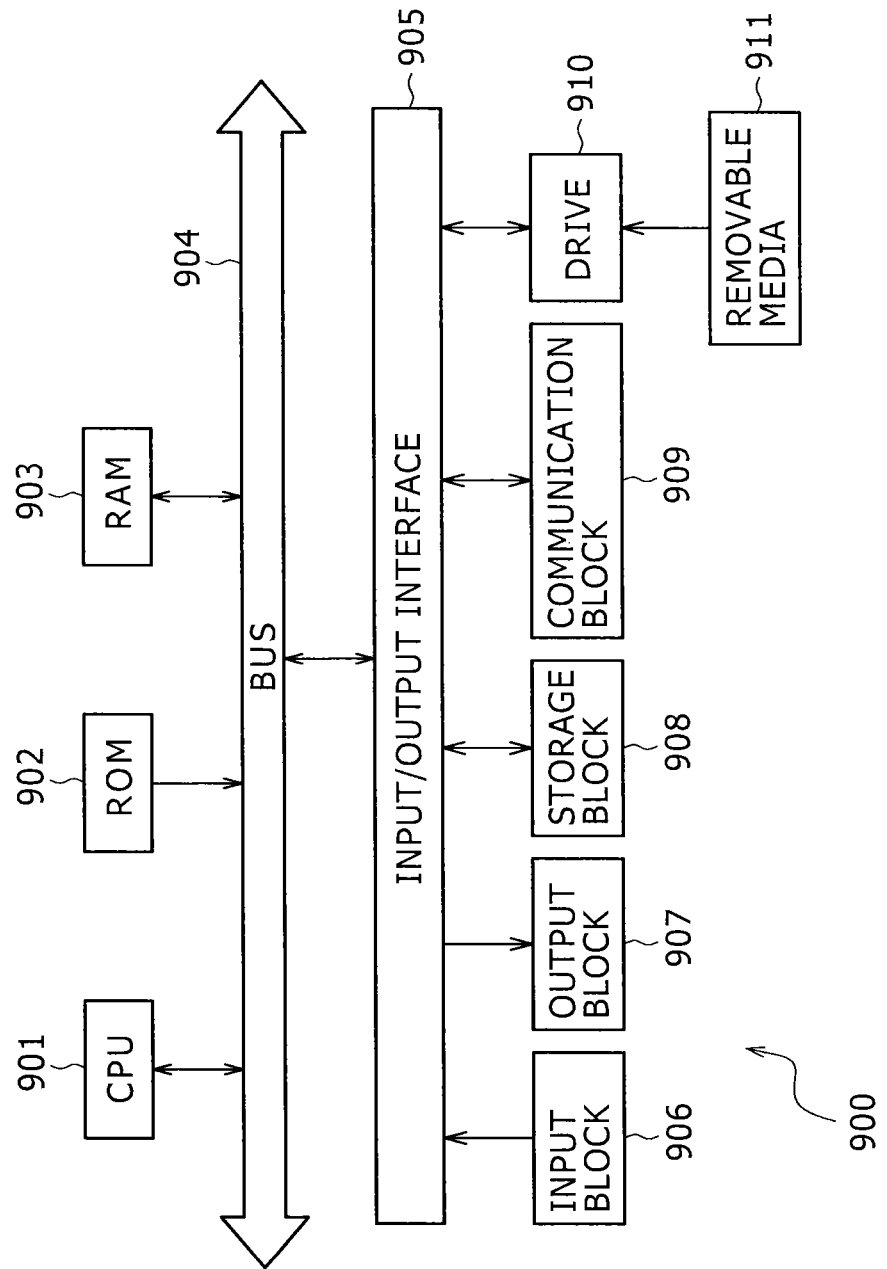
FIG. 18 is a block diagram illustrating an exemplary configuration of a computer.

FIG. 18 shows a configuration example of the hardware of a computer that runs programs to execute the process described above.

In a computer 900, a CPU (Central Processing Unit) 901, a ROM (Read Only Memory) 902, and a RAM (Random Access Memory) 903 are interconnected by a bus 904.

The bus 904 is connected with an input/output interface 905. The input/output interface 905 is further connected with an input block 906, an output block 907, a recording block 908, a communication block 909, and a drive 910.

The input block 906 may be a keyboard, a mouse, and a microphone, for example. The output block 907 may be a display and a loudspeaker, for example. The recording block 908 may be a hard disk and a nonvolatile memory, for example. The communication block 909 may be a network interface, for example. The drive 910 drives a removable medium 911 such as an optical disk or a semiconductor memory.

In the computer 900 configured as described above, the CPU 901 performs the process described above by loading programs from the recording block 908 into the RAM 903 via the input/output interface 905 and bus 904 and executing the loaded programs.

Programs to be executed by the computer 900 (or the CPU 901) can be, for example, provided by recording them in the removable medium 911 that is a package medium. The programs may also be provided via wired or wireless transmission media such as a local area network, the Internet, and digital satellite broadcasting.

In the computer 900, programs can be installed in the recording block 908 via the input/output interface 905 by loading the removable medium 911 on the drive 910. Programs can also be installed in the recording block 908 by receiving them through the communication block 909 via wired or wireless transmission media. In addition, programs can be installed in the ROM 902 or the recording block 908 in advance.

The programs run by the computer 900 may be executed sequentially in the chronological order described herein, or in a parallel manner, or at required timings such as when they are called.

Here, in this specification, the process steps in which the programs that allow the computer 900 to execute the various kinds of processes are written need not to be processed in the chronological order described in the flow charts. They may be processed in a parallel manner or individually (for example, parallel processing or object-oriented processing).

The programs may be processed by one computer and or processed by two or more computers in a distributed manner. Programs may also be transmitted to a remote computer and executed therein.

In addition, in this specification, a system means a collection of a plurality of constituent elements (devices or apparatuses, modules (components), etc.), and the constituent elements do not need to be all included in the same housing. Therefore, a plurality of apparatuses accommodated in different housings but connected to one another through a network is a system, and one device or apparatus accommodating a plurality of modules in one housing is a system as well.

Embodiments of the present technology are not limited to those described herein, and various changes may be made without departing from the spirit and scope of the present technology.

For example, the technology disclosed herein can be configured as a cloud computing system in which one function is processed jointly by a plurality of apparatuses via a network.

The steps of the flowcharts described above may be executed by one apparatus or a plurality of apparatuses.

Further, if one step includes a plurality of processes, the plurality of processes included in the one step may be executed by one apparatus or jointly by a plurality of apparatuses.

Embodiments of the present technology may also take the following configurations.

(1)

A reception apparatus including:

a reception block configured to receive AV (Audio Visual) content;

a cache memory configured to temporarily store an application program that is executed in coordination with the AV content; and a control block configured to, when a plurality of the application programs exist, control the cache memory in accordance with priority of the application programs corresponding to a predetermined frequency specified for each of them in advance.

(2)

The reception apparatus according to (1), wherein the priority is determined based on at least one of a frequency of use and frequency of update of the application programs.

(3)

The reception apparatus according to (2), wherein the application programs are categorized into two groups, namely, those prioritized by a provider thereof and those that are not, and the priority of the application programs categorized as to be preferred is set such that it is always higher than the priority of the other application programs not categorized as to be preferred.

(4)

The reception apparatus according to (2) or (3), further including a terminal information acquisition block configured to acquire terminal information that is used to determine the priority and can be obtained in the reception apparatus, wherein the priority is determined based on the terminal information.

(5)

The reception apparatus according to (4), wherein the terminal information is information that indicates a use history of the application program or a cache capacity or free capacity of the cache memory.

(6)

The reception apparatus according to any one of (2) to (5), wherein the priority is determined based on an expiration date specified in advance for each of the application programs.

(7)

The reception apparatus according to (1), further including:

a trigger information acquisition block configured to acquire trigger information used to identify a command for controlling the operation of the application program; and a correlation table acquisition block configured to acquire a correlation table in which information obtained from the trigger information is correlated with the command, wherein the control block controls the operation of the application program according to the command identified by the trigger information and correlation table.

(8)

The reception apparatus according to (7), wherein the priority is determined according to at least one of frequency of use, frequency of update, and expiration date of the application program which are specified by the correlation table, and the category of priority of the application program set by the provider.

(9)

A reception method including:

receiving AV content; and controlling, when there are a plurality of application programs to be executed in coordination with the AV content in a cache memory that temporarily stores them, the cache memory in accordance with priority of the application programs corresponding to a predetermined frequency specified for each application program in advance.

(10)

A transmission apparatus including:

a generation block configured to, when there exist a plurality of application programs that are to be executed in coordination with AV content, generate trigger information used to control the operations of the application programs recorded in a cache memory in accordance with priority corresponding to a predetermined frequency specified for each application program in advance; and a transmission block configured to transmit the trigger information along with the AV content.

(11)

A transmission method including:

generating, when there exist a plurality of application programs that are to be executed in coordination with AV content, trigger information used to control the operations of the application programs recorded in a cache memory in accordance with priority corresponding to a predetermined frequency specified for each application program; and transmitting the trigger information along with the AV content.

What is claimed is:

1. A reception apparatus comprising:

a cache memory that temporarily stores an application program that is to be executed in coordination with audio visual content; and circuitry that receives the audio visual content, acquires trigger information used to identify a command for controlling operation of the application program, acquires, from a server based on the trigger information, a correlation table in which information obtained from the trigger information is correlated with the command, the correlation table including predetermined frequency of use information, controls the operation of the application program according to the command identified by the trigger information and the correlation table, and manages storage of a plurality of application programs currently stored in the cache memory based on the predetermined frequency of use information included in the acquired correlation table, the plurality of application programs including the application program.

2. The reception apparatus according to claim 1, wherein the circuitry further manages the storage of the application programs based on frequency of update information of the application programs.

3. The reception apparatus according to claim 2, wherein
the application programs are categorized into two groups, including a first group prioritized by a provider thereof and a second group not prioritized by the provider thereof,
priorities of any of the application programs categorized in the first group is set to always be higher than the priorities of any of the application programs in the second group,
and the circuitry further manages the storage of the application programs based on the priorities.

4. The reception apparatus according to claim 2, wherein
the circuitry acquires terminal information that is used to manage the storage of the application programs and can be obtained in the reception apparatus,
wherein the circuitry further manages the storage of the application programs based on the terminal information.

5. The reception apparatus according to claim 4, wherein the terminal information is information that indicates a use history of one or more of the application programs or a cache capacity or free capacity of the cache memory.

6. The reception apparatus according to claim 2, wherein the circuitry further manages the storage of the application programs based on an expiration date specified in advance for each of the application programs.

7. The reception apparatus according to claim 1, wherein the circuitry further manages the storage of the application programs based on at least one of frequency of update information and an expiration date of the application program which is specified by the correlation table.

8. The reception apparatus according to claim 1, wherein the circuitry further manages the storage of the application programs based on predetermined frequency of use information for each of the application programs specified in advance.

9. The reception apparatus according to claim 1, wherein the correlation table is separate from the trigger information.

10. A reception method comprising:
receiving, by circuitry of a reception apparatus, audio visual content;
acquiring trigger information used to identify a command for controlling operation of an application program,
acquiring, by the circuitry from a server based on the trigger information, a correlation table in which information obtained from the trigger information is correlated with the command, the correlation table including predetermined frequency of use information,
controlling the operation of the application program according to the command identified by the trigger information and the correlation table, and
managing, by the circuitry, storage of a plurality of application programs currently stored in the cache memory based on the predetermined frequency of use information included in the acquired correlation table, the plurality of application programs including the application program.

11. A transmission apparatus comprising:
circuitry that
when a plurality of application programs are to be executed in coordination with audio visual content, generates trigger information used to control operations of the application programs stored in a cache memory of a reception apparatus, which manages storage of the application programs in the cache memory in accordance with predetermined frequency of use information specified for each of the application programs in advance, the predetermined frequency of use information being provided to the reception apparatus in a plurality of correlation tables in which information included in the trigger information are correlated with commands for controlling the operations of the application programs; and
transmit the trigger information along with the audio visual content,
wherein one of the plurality of correlation tables is acquired by the reception apparatus based on the trigger information.

12. A transmission method comprising:
generating, by circuitry of a transmission apparatus when a plurality of application programs are to be executed in coordination with audio visual content, trigger information used to control operations of the application programs stored in a cache memory of a reception apparatus, which manages storage of the application programs in the cache memory in accordance with predetermined frequency of use information specified for each of the application programs in advance, the predetermined frequency of use information being provided to the reception apparatus in a plurality of correlation tables in which information included in the trigger information are correlated with commands for controlling the operations of the application programs; and
transmitting, by the circuitry, the trigger information along with the audio visual content,
wherein one of the plurality of correlation tables is acquired by the reception apparatus based on the trigger information.

* * * * *